United States Patent
Mitsuma et al.

(10) Patent No.: US 11,886,724 B2
(45) Date of Patent: Jan. 30, 2024

(54) COPYING DATA FROM A LINEAR TAPE FILE SYSTEM (LTFS)-BASED STORAGE SYSTEM TO A RANDOM ACCESS NONVOLATILE MEMORY (RANVM) DRIVE IN UNITS OF BLOCKS OF THE DRIVE

(71) Applicant: International Business Machines Corporation, Armonk, NY (US)

(72) Inventors: Shinsuke Mitsuma, Higashimurayama (JP); Tsuyoshi Miyamura, Yokohama (JP); Hiroshi Itagaki, Yokohama (JP); Tohru Hasegawa, Tokyo (JP); Noriko Yamamoto, Tokyo (JP); Sosuke Matsui, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/108,936

(22) Filed: Dec. 1, 2020

(65) Prior Publication Data
US 2022/0171531 A1 Jun. 2, 2022

(51) Int. Cl.
*G06F 3/06* (2006.01)

(52) U.S. Cl.
CPC .......... *G06F 3/064* (2013.01); *G06F 3/0619* (2013.01); *G06F 3/0659* (2013.01); *G06F 3/0679* (2013.01); *G06F 3/0682* (2013.01)

(58) Field of Classification Search
CPC ...... G06F 3/064; G06F 3/0619; G06F 3/0659; G06F 3/0679; G06F 3/0682
See application file for complete search history.

(56) References Cited

U.S. PATENT DOCUMENTS

| 10,168,920 B2 | 1/2019 | Abe et al. |
| 2001/0003829 A1 | 6/2001 | Romine |
| 2011/0276754 A1* | 11/2011 | Bish ........................ G06F 3/064 711/111 |

(Continued)

OTHER PUBLICATIONS

IBM, "IBM LTFS Copy Tool," IBM Knowledge Center, 2020, 4 pages, retrieved from https://www.ibm.com/support/knowledgecenter/en/STZMZN/com.ibm.storage.hollywood.doc/ltfs_reference_ltfs_copy.html.

(Continued)

*Primary Examiner* — Kalpit Parikh
(74) *Attorney, Agent, or Firm* — Zilka-Kotab, P.C.

(57) ABSTRACT

A computer-implemented method according to one approach includes copying data stored on a Linear Tape File System (LTFS)-based storage system to blocks of a Random Access Nonvolatile Memory (RANVM) drive. The data is copied in units of the blocks of the drive. The method further includes constructing file metadata so that the copied data on the drive is accessible as one or more files. A computer program product according to another approach includes a computer readable storage medium having program instructions embodied therewith. The program instructions are readable and/or executable by a controller to cause the controller to perform the foregoing method. A system according to another approach includes a processor, and logic integrated with the processor, executable by the processor, or integrated with and executable by the processor. The logic is configured to perform the foregoing method.

24 Claims, 19 Drawing Sheets

(56) References Cited

U.S. PATENT DOCUMENTS

| | | | |
|---|---|---|---|
| 2012/0054428 A1 | 3/2012 | Butt et al. | |
| 2012/0284587 A1* | 11/2012 | Yu | G06F 12/0868 |
| | | | 711/E12.008 |
| 2014/0160907 A1* | 6/2014 | Davis | G11B 20/1217 |
| | | | 369/30.01 |
| 2014/0201424 A1 | 7/2014 | Chen et al. | |
| 2015/0095566 A1* | 4/2015 | Itagaki | G06F 3/0682 |
| | | | 711/111 |
| 2016/0283493 A1* | 9/2016 | Wideman | G06F 16/119 |
| 2016/0335188 A1* | 11/2016 | Romanovskiy | G06F 3/065 |
| 2017/0052718 A1 | 2/2017 | Abe et al. | |
| 2018/0018238 A1* | 1/2018 | Tomii | G06F 16/13 |

OTHER PUBLICATIONS

Levens, S., "Moving Tape Content to Backblaze Fireball with Canister," Backblaze, Sep. 6, 2018, 7 pages, retrieved from https://www.backblaze.com/blog/moving-tape-content-to-cloud-storage/.

IBM, "Migrating data from tape to DISK or FILE devices," IBM Knowledge Center, 2020, 3 pages, retrieved from https://www.ibm.com/support/knowledgecenter/SSGSG7_7.1.0/com.ibm.itsm.srv.upgrd.doc/t_xplat_mig_data_frm_tape.html.

AWS, "AWS Black Belt online seminar 2017 Snowball," Amazon Web Services Japan, Jun. 14, 2017, 47 pages, retrieved from https://www.slideshare.net/AmazonWebServicesJapan/20170614-aws-blackbeltsnowball.

AWS, "AWS Snowball," Amazon Web Services, 2020, 17 pages, retrieved from https://aws.amazon.com/snowball/.

Google Cloud, "Transfer Appliance," Google Cloud Newsletter, 2020, 2 pages, retrieved from https://cloud.google.com/transfer-appliance/.

SNIA, "Linear Tape File System (LTFS) Format Specification, Version 2.5," SNIA Technical Position, May 19, 2019, 97 pages.

StorEasy, "Cloud Gateway LTFS," StorEasy, 2018, 10 pages, retrieved from https://www.storeasy.cloud/cloud-gateway-ltfs/.

SNIA, "LTFS Bulk Transfer, Version 1.0," SNIA Technical Position, Oct. 11, 2016, 41 pages.

IBM "LTFS Copy Tool functions," IBM Knowledge Center, 2020, 2 pages, retrieved from https://www.ibm.com/support/knowledgecenter/en/STQNYL_2.2.2/ltfs_reference_lcp_functions.html.

Wikipedia, "File system fragmentation," Wikipedia, 2020, 6 pages, retgrieved from https://en.wikipedia.org/wiki/File_system_fragmentation.

Microsoft, "How FAT Works," Oct. 8, 2009, 26 pages, retrieved from https://docs.microsoft.com/en-us/previous-versions/windows/it-pro/windows-server-2003/cc776720(v=ws.10).

IBM, "Rolling back media," IBM Knowledge Center, 2020, 4 pages, retrieved from https://www.ibm.com/support/knowledgecenter/STQNYL_2.4.1/ltfs_rolling_back_media_win.html.

International Search Report and Written Opinion from PCT Application No. PCT/EP2021/081990, dated Mar. 2, 2022.

* cited by examiner

1500

```
1:  For (each file in LTFS) {
2:      t_bloc_cnt = 0;   //target block count of the file
3:      t_bloc_1st = empty;   //target block list of the file
4:      for each LTFS extent of the file {
5:          1_bloc = (Start Block of the LTFS extent);
6:          1_byte_off = (Byte Offset of the LTFS extent);
7:          t_bloc = LB_to_TB(1_bloc, 1_byte_off);
8:          t_byte_off = (1_byte_off % TBS);
9:          if (0 < t_byte_off) {
10:             // Copy valid data to previous target block of the file
11:             1_byte_cnt = (Byte count of the LTFS extent);
12:             t_data_siz = (1_byte_cnt < (TBS - t_byte_off)) ?
                                1_byte_cnt : (TBS - t_byte_off));
13:             TB_COPY(t_bloc_1st[t_bloc_cnt], t_bloc, t_byte_off, t_data_siz);
14:             1_data_off = t_data_siz;
15:         }
16:         else {
17:             1_data_off = 0;
18:         }
19:         for ( ; 1_data_off < 1_byte_cnt; 1_data_off += TBS) {
20:             1_lock = (Start block of the LTFS extent) +
                                ((1_byte_off + 1_data_off) / LBS);
21:             t_bloc = LB_TO_TB(1_bloc, ((1_byte_off + 1_data_off) % LBS));
22:             t_bloc_1st(t_boc_cnt++) = t_bloc;
23:         }
24:     }
25:     TB_ALLOC(the file, t_bloc_1st, t_bloc_cnt);
26: }
```

FIG. 15

COPYING DATA FROM A LINEAR TAPE FILE SYSTEM (LTFS)-BASED STORAGE SYSTEM TO A RANDOM ACCESS NONVOLATILE MEMORY (RANVM) DRIVE IN UNITS OF BLOCKS OF THE DRIVE

BACKGROUND

The present invention relates to data storage systems, and more particularly, this invention relates to copying data from a LTFS-based storage system to a RANVM drive in units of blocks of the drive.

In some data storage settings, data is eventually shifted from residing on an on-premise environment to a cloud based environment. In some environments, this shifting may include migrating a relatively large amount of data. Some cloud vendors recognize and discuss an importance in efficiently migrating data during such a shift. Specifically, it has been discussed that line reinforcement for temporary data movement may be unrealistic, though data transfer is made essentially via network, and off-line data transfer measures by logistics are introduced. Some cloud vendors provide services through original development of appliances exclusively used for data transfer. On the other hand, other cloud vendors provide data transfer services using LTFS. A method for transferring a relatively massive amount of data from one system to another system by using LTFS is also standardized in some approaches. Some cloud venders guarantee online accessibility of data delivered by logistics within 24 hours from the receipt of the data. It is important to note that such guarantees are made irrespective of the size of a data volume that is to be migrated. Securing such a guarantee typically includes taking account of a volume of data received from logistics per unit of time as well as a volume of received data which can be copied to the online system per unit of time. Consideration of these metrics may be made in order to construct, maintain and manage a system by preventing the former metric from exceeding the latter metric. For example, an operation for using LTFS for data transfer may include securing a number of tape drives so that an extent of tape cartridges received in one day can be processed within one day. In such an example, a predicted time for performing a data copy as well as a specification that the data be copied in a relatively short period of time may be demanded. This operation may be particularly useful in environments in which such demands exist.

LTFS simplifies tape handling in comparison with some conventional data storage techniques, however, some characteristics due to use of tape in a storage device remain the same. When a file is read from a magnetic storage device such as a HDD or magnetic tape, a device, e.g., the device head, is aligned for reading data at a position at which file data is stored. This process is also known as a seek. Seek operations in a HDD include only movement of an arm with a head on a disk having a diameter of several centimeters, and therefore seeks may take only several tens of milliseconds at maximum to be performed. In contrast, seek operations on a magnetic tape include winding of the magnetic tape, which can have a length of over 1000 meters. Accordingly, seek operations on magnetic tape can take relatively much longer to perform than the seek operations in a HDD. When relatively large files are copied from a LTFS-based storage system to a HDD, these relatively longer seek times can add a considerable amount of time to the data copy process.

SUMMARY

A computer-implemented method according to one approach includes copying data stored on a Linear Tape File System (LTFS)-based storage system to blocks of a Random Access Nonvolatile Memory (RANVM) drive. The data is copied in units of the blocks of the drive. The method further includes constructing file metadata so that the copied data on the drive is accessible as one or more files. Data is efficiently copied from the LTFS-based storage system to the blocks of the RANVM drive based on the data being copied in units of the drive. This is because otherwise copying the data from the LTFS-based storage system to the drive in units of files of the data would utilize data seek operations being performed which would ultimately increase the time required to perform the data copy. These seek operations on a magnetic tape include winding of the magnetic tape, which can have a length of over 1000 meters. When relatively large files are copied from a LTFS-based storage system to a drive, these relatively longer seek times can add a considerable amount of time to the data copy process. However, in the current approach, no data seek operations may be performed on the magnetic recording tape during the copying of the data thereon to the blocks of the drive, e.g., to determine the start location of an instance of data that is copied, to determine the end location of an instance of data that is copied, to determine the locations of split data and/or a fragmented data file on a tape of the LTFS-based storage system, etc. Accordingly, by avoiding at least some of these seek operations, the file data is copied from the LTFS-based storage system to the drive in significantly less time than an amount of time that would be consumed if copying the file data from the LTFS-based storage system to the drive included performing data seeks. For example, each avoided seek operation may reduce a time of the copy process by up to approximately several tens of seconds.

A correspondence table may be created during the copying of the data. The correspondence table may map data positions in LTFS to data positions on the drive. Accordingly, the correspondence table may be used to understand which position on the drive is used to copy data at any position on the blocks on the LTFS-based storage system.

A computer program product according to another approach includes a computer readable storage medium having program instructions embodied therewith. The program instructions are readable and/or executable by a controller to cause the controller to perform the foregoing method.

A system according to another approach includes a processor, and logic integrated with the processor, executable by the processor, or integrated with and executable by the processor. The logic is configured to perform the foregoing method.

Any of these approaches may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 15 is a sample of pseudocode, in accordance with one approach.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred approaches of data storage systems, as well as operation and/or component parts thereof.

In one general approach, a computer-implemented method includes copying data stored on a Linear Tape File System (LTFS)-based storage system to blocks of a Random Access Nonvolatile Memory (RANVM) drive. The data is copied in units of the blocks of the drive. The method further includes constructing file metadata so that the copied data on the drive is accessible as one or more files.

In another general approach, a computer program product includes a computer readable storage medium having program instructions embodied therewith. The program instructions are readable and/or executable by a controller to cause the controller to perform the foregoing method.

In another general approach, a system includes a processor, and logic integrated with the processor, executable by the processor, or integrated with and executable by the processor. The logic is configured to perform the foregoing method.

Figure 1A:
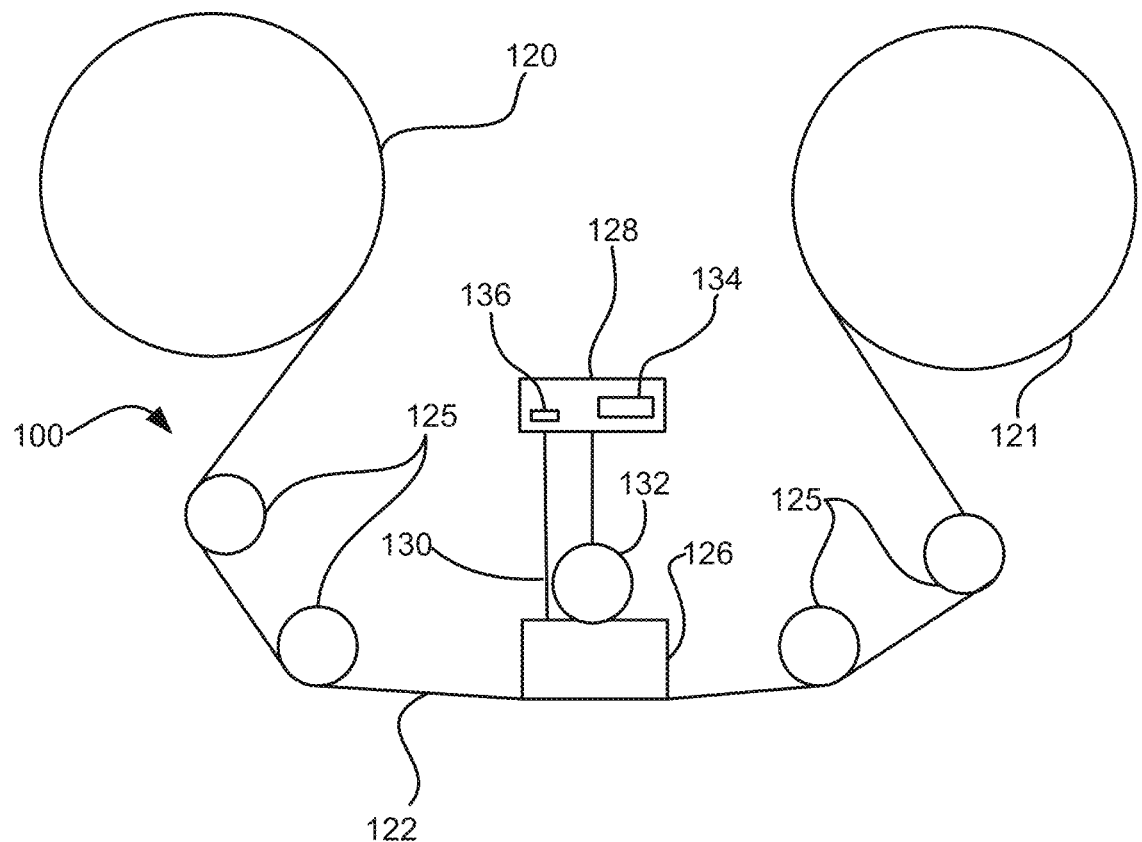
FIG. 1A is a schematic diagram of a simplified tape drive system according to one approach.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein.

Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
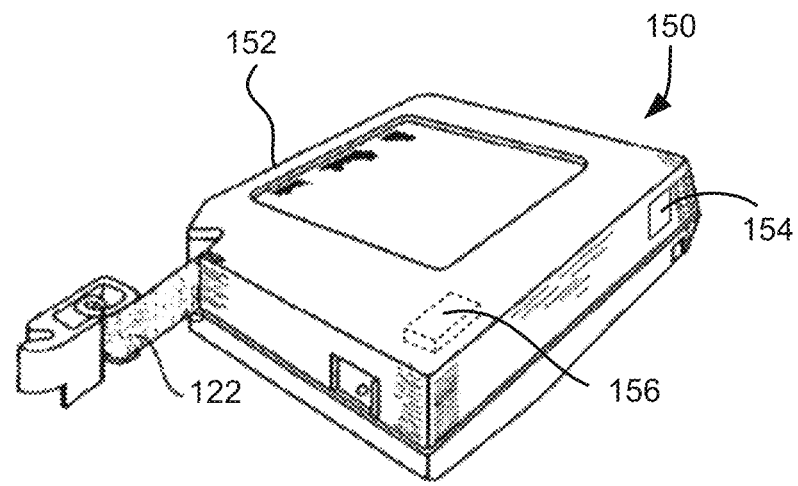
FIG. 1B is a schematic diagram of a tape cartridge according to one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
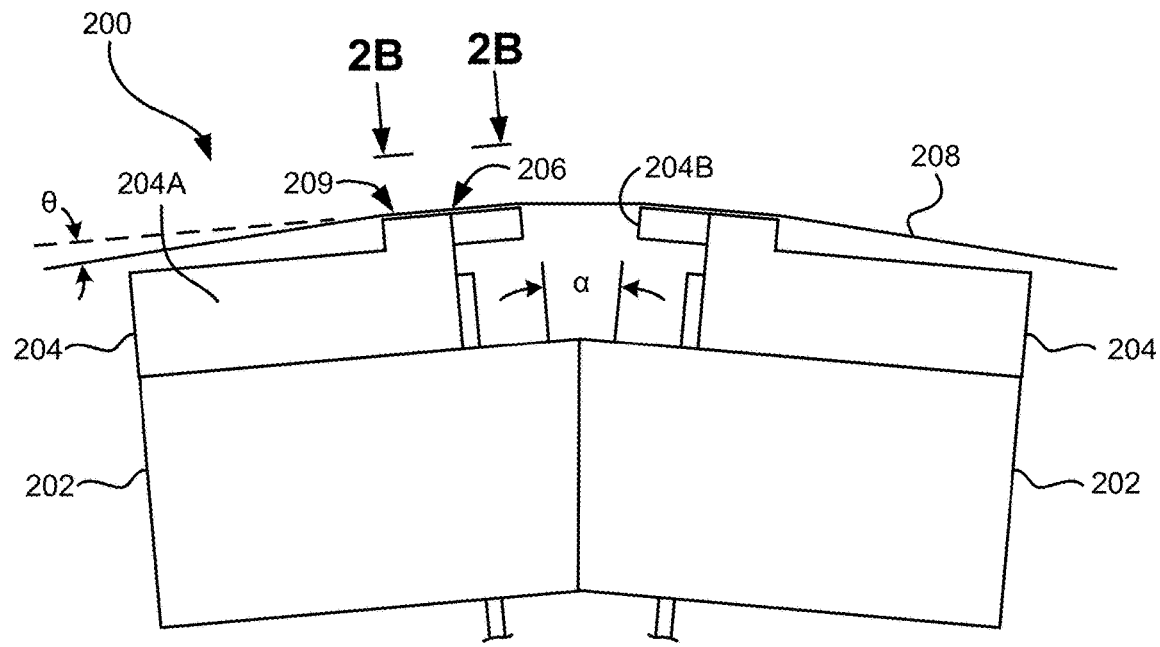
FIG. 2A illustrates a side view of a flat-lapped, bi-directional, two-module magnetic tape head according to one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
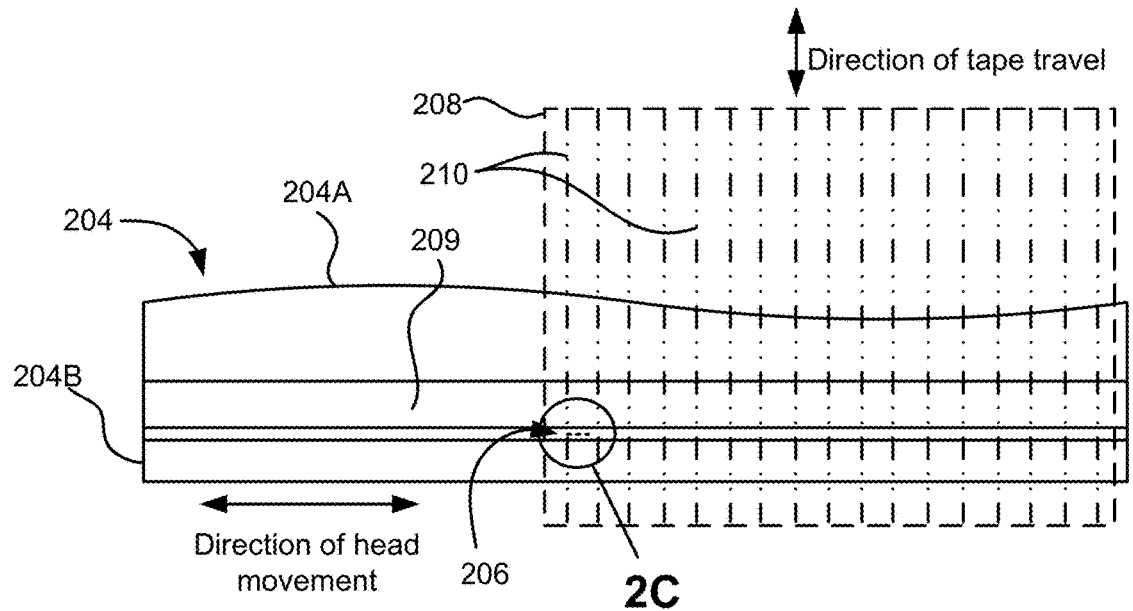
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
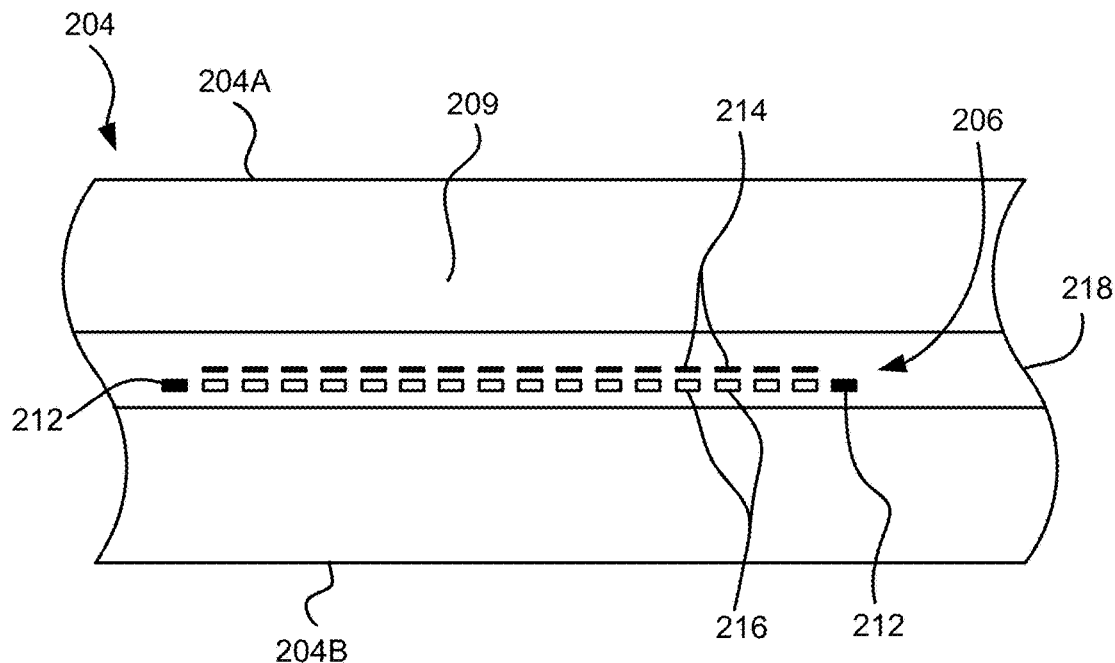
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative approaches include 8, 16, 32, 40, and 64 active read transducers and/or write transducers 206 per array, and alternatively interleaved designs having odd numbers of read transducers or write transducers such as 17, 25, 33, etc. An illustrative approach includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
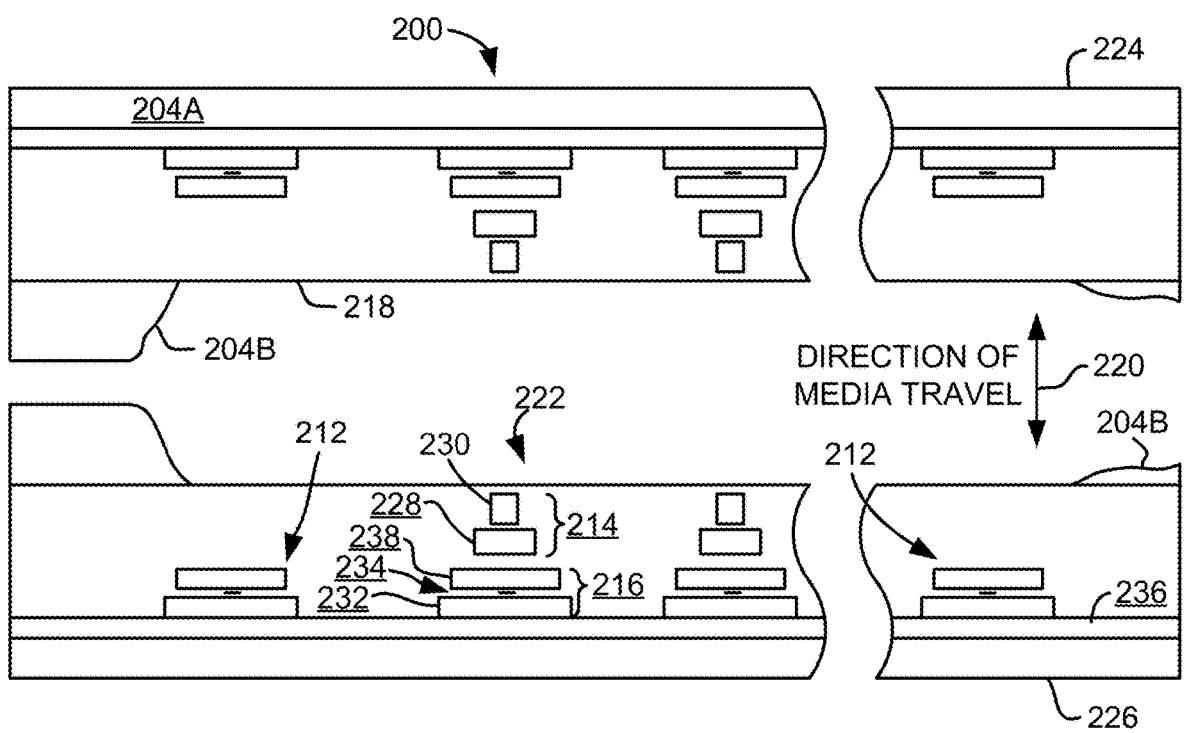
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several RAY pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of RAY pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the RAY pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
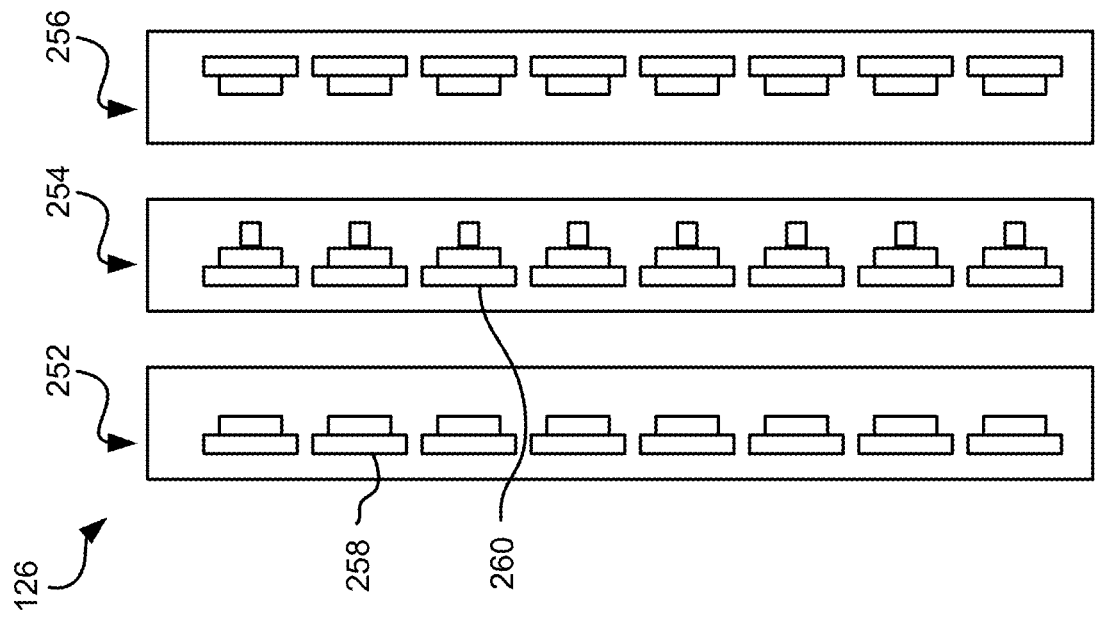
FIG. 4 is a partial tape bearing surface view of a magnetic head having a read-write-read configuration.
Figure 3:
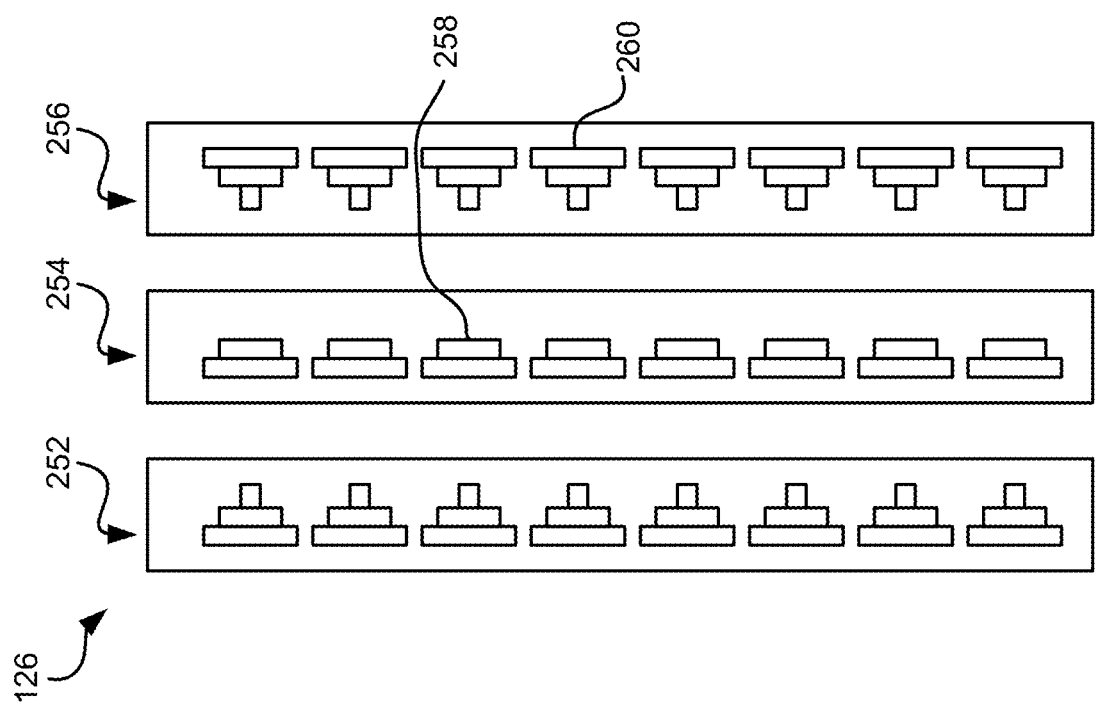
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
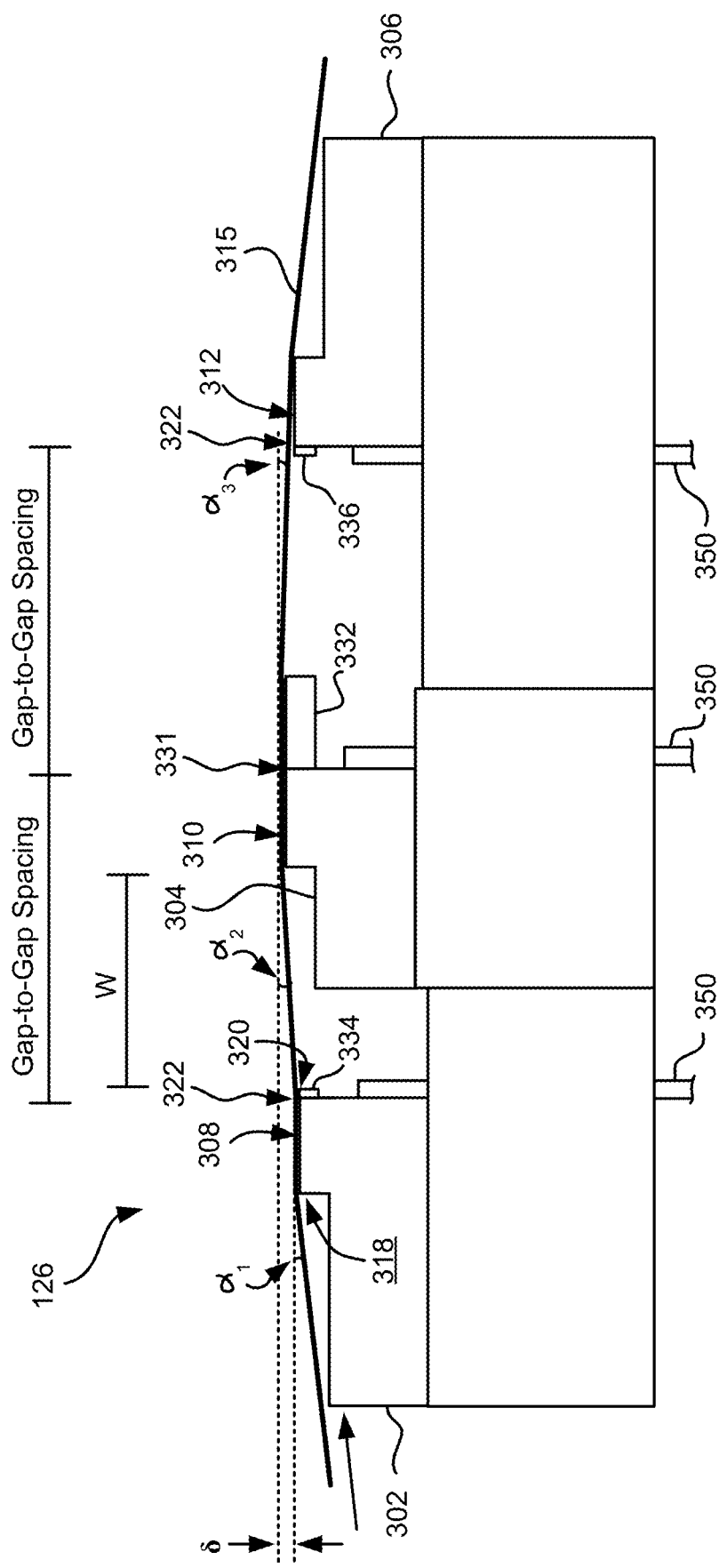
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
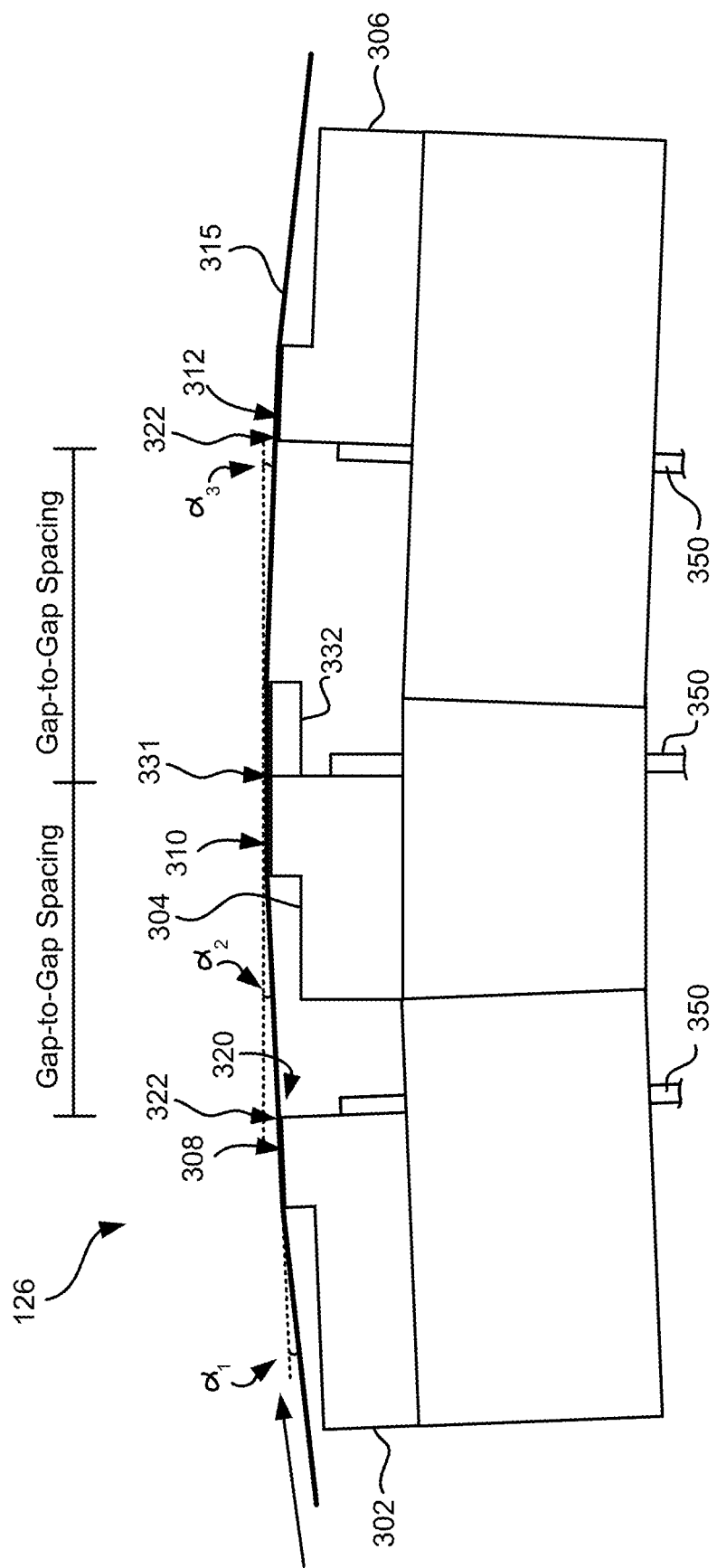
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
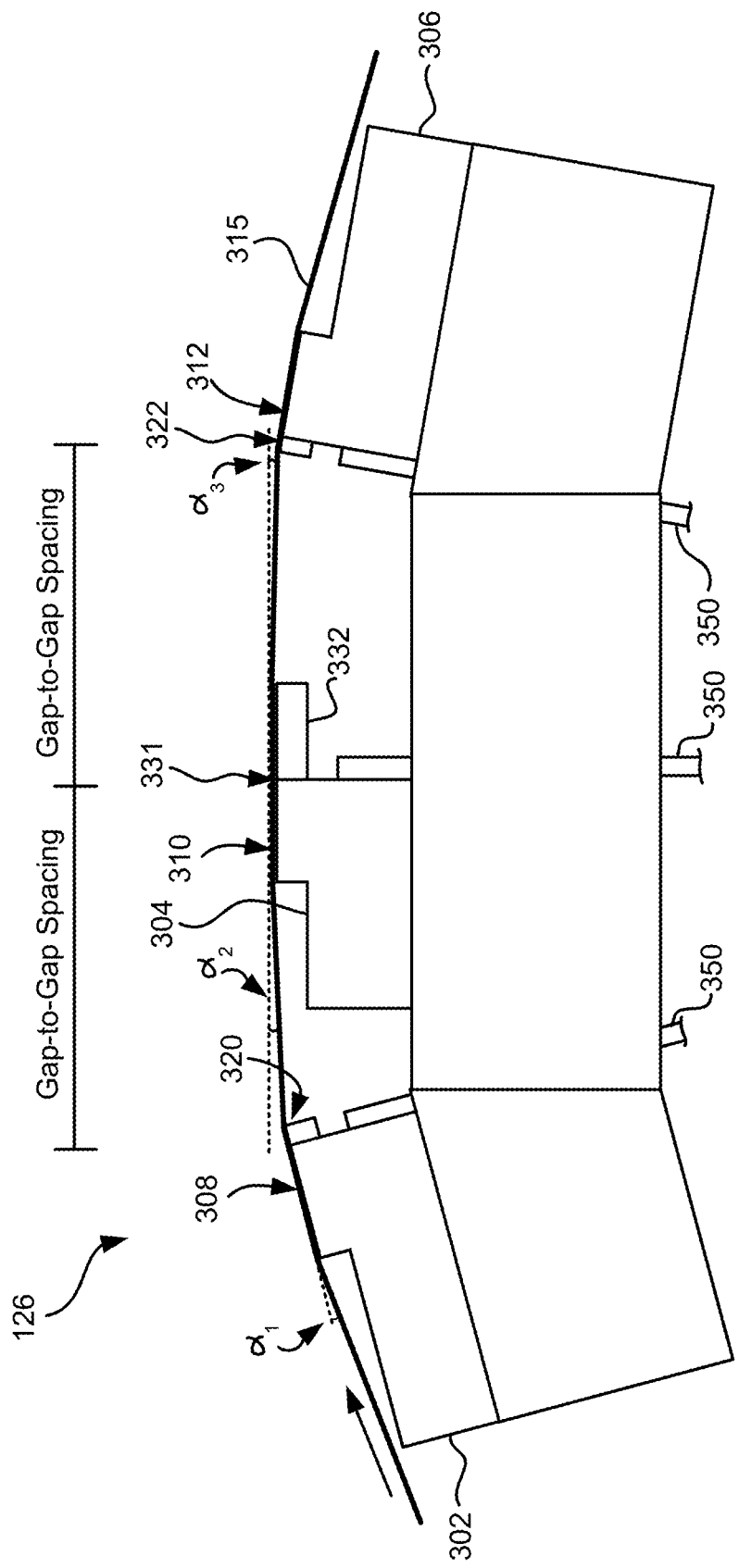
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
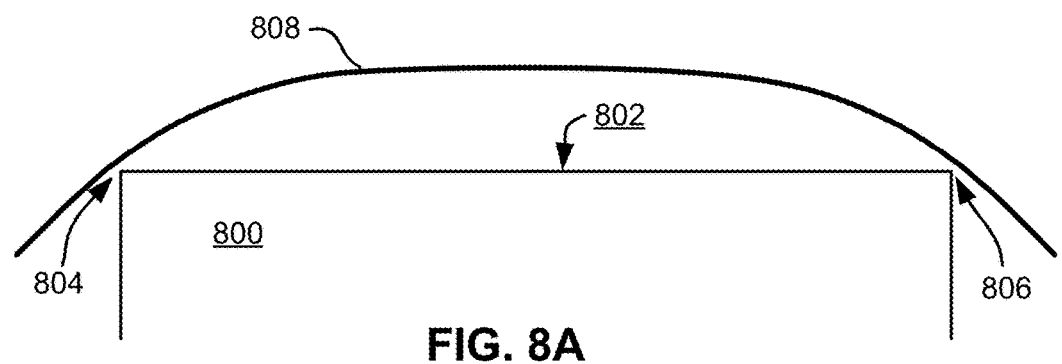
FIGS. 8A-8C are schematics depicting the principles of tape tenting.
Figure 8B:
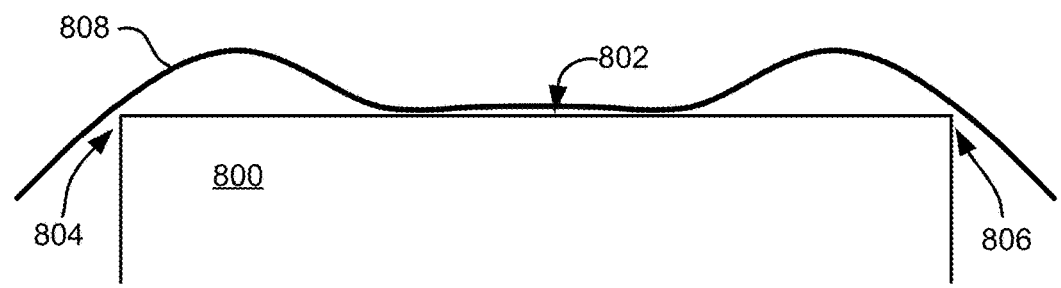
Figure 8C:
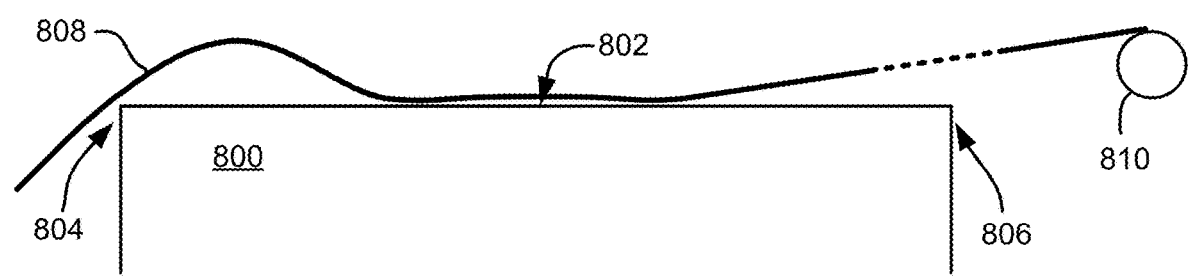

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various approaches herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
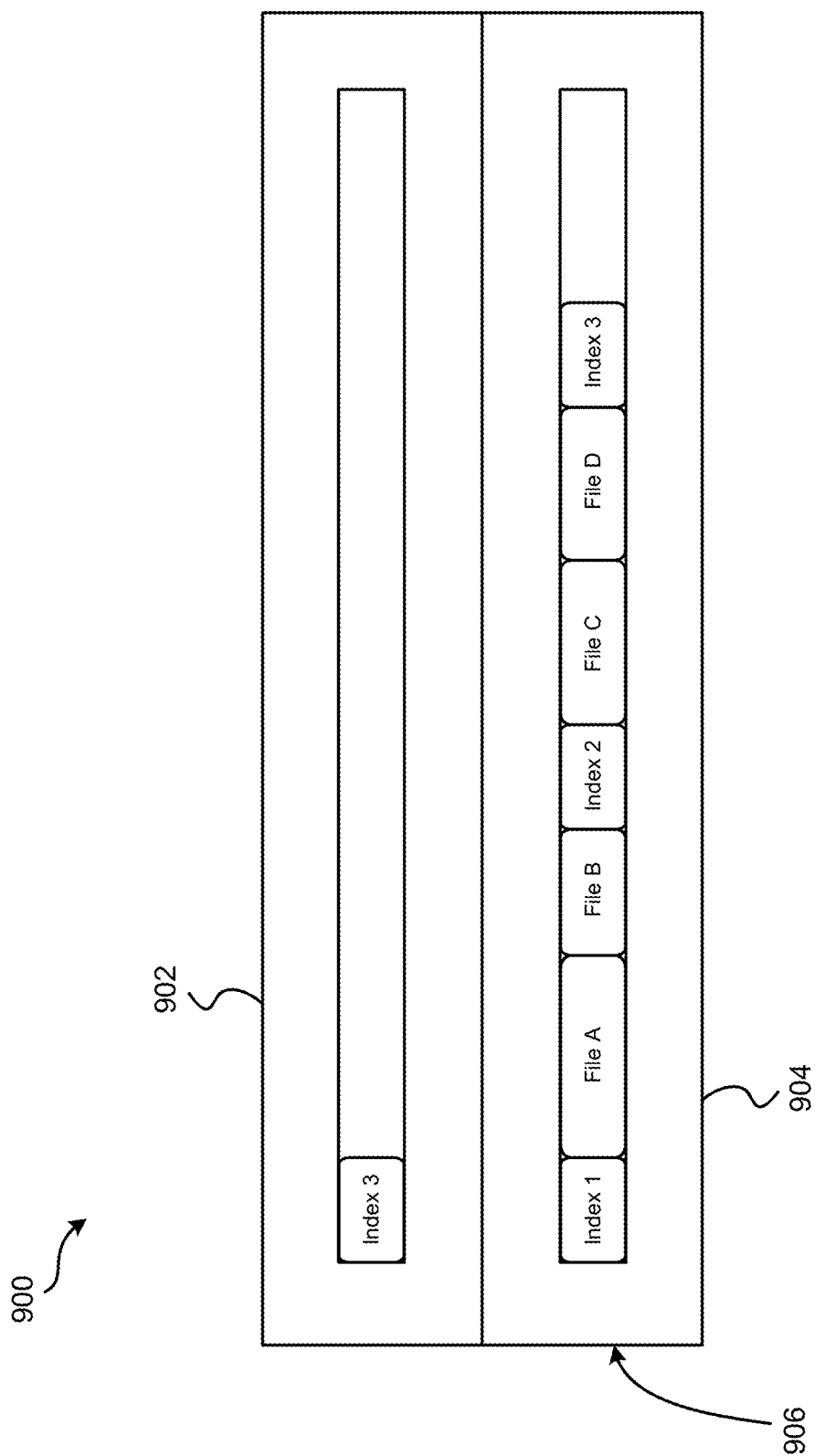
FIG. 9 is a representational diagram of files and indexes stored on a magnetic tape according to one approach.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Figure 10:
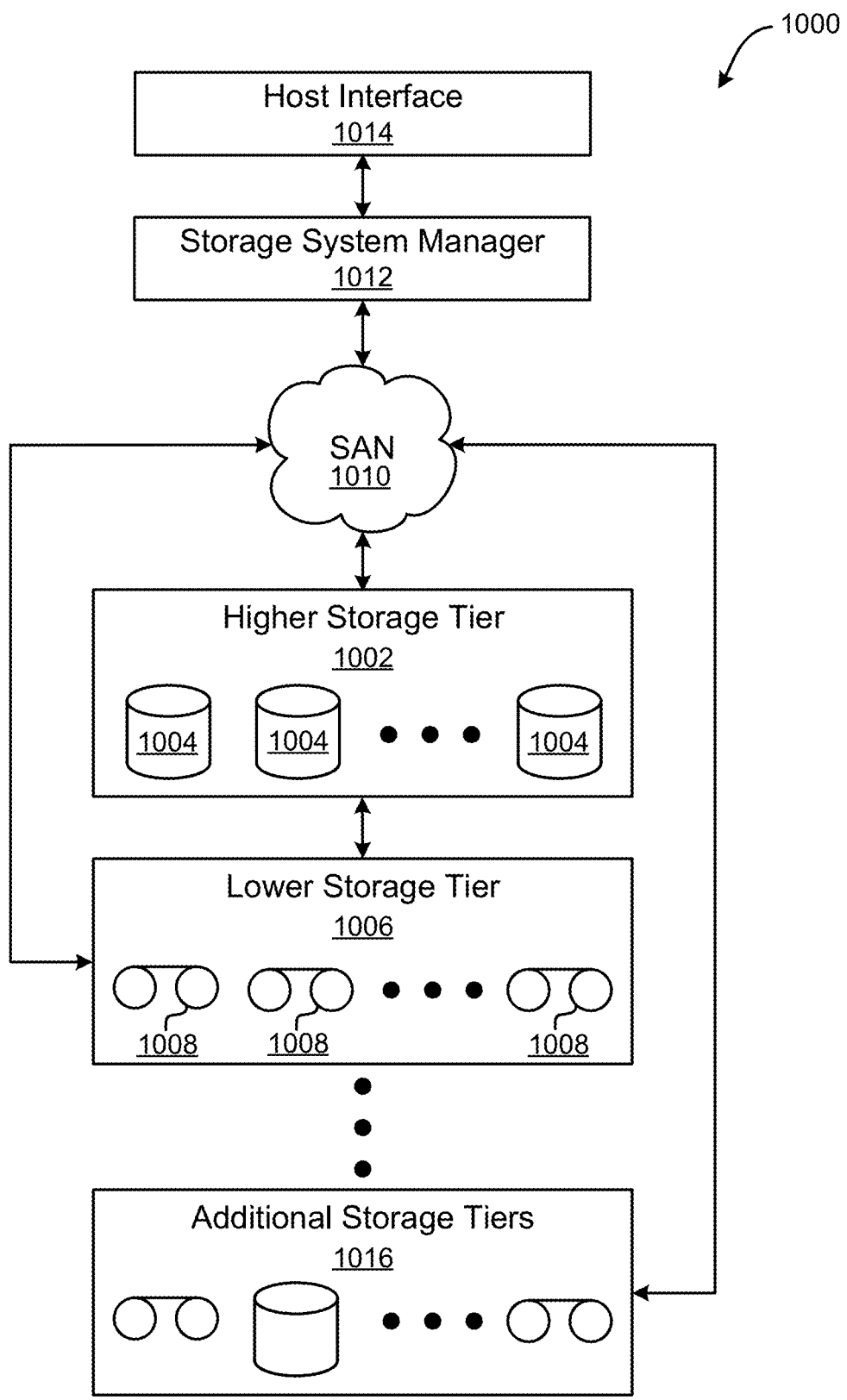
FIG. 10 is a diagram of a tiered data storage system, in accordance with one approach.

Now referring to FIG. 10, a storage system 1000 is shown according to one approach. Note that some of the elements shown in FIG. 10 may be implemented as hardware and/or software, according to various approaches. The storage system 1000 may include a storage system manager 1012 for communicating with a plurality of media and/or drives on at least one higher storage tier 1002 and at least one lower storage tier 1006. The higher storage tier(s) 1002 preferably may include one or more random access and/or direct access media 1004, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 1006 may preferably include one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Also, any of the higher storage tiers 1002 and/or the lower storage tiers 1006 may include some combination of storage devices and/or storage media.

The storage system manager 1012 may communicate with the drives and/or storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the approaches presented herein.

According to some approaches, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various approaches.

As mentioned elsewhere above, in some data storage settings, data is eventually shifted from residing on an on-premise environment to a cloud based environment. In some environments, this shifting may include migrating a relatively large amount of data. Some cloud vendors recognize and discuss an importance in efficiently migrating data during such a shift. Specifically, it has been discussed that line reinforcement for temporary data movement may be unrealistic, though data transfer is made essentially via network, and off-line data transfer measures by logistics are introduced. Some cloud vendors provide services through original development of appliances exclusively used for data transfer. On the other hand, other cloud vendors provide data transfer services using LTFS. A method for transferring a relatively massive amount of data from one system to another system by using LTFS is also standardized in some approaches. Some cloud venders guarantee online accessibility of data delivered by logistics within 24 hours from the receipt of the data. It is important to note that such guarantees are made irrespective of the size of a data volume that is to be migrated. Securing such a guarantee typically includes taking account of a volume of data received from logistics per unit of time as well as a volume of received data which can be copied to the online system per unit of time. Consideration of these metrics may be made in order to construct, maintain and manage a system by preventing the former metric from exceeding the latter metric. For example, an operation for using LTFS for data transfer may include securing a number of tape drives so that an extent of tape cartridges received in one day can be processed within one day. In such an example, a predicted time for performing a data copy as well as a specification that the data be copied in a relatively short period of time may be demanded. This operation may be particularly useful in environments in which such demands exist.

LTFS simplifies tape handling in comparison with some conventional data storage techniques, however, some characteristics due to use of tape in a storage device remain the same. When a file is read from a magnetic storage device such as a HDD or magnetic tape, a device, e.g., the device head, is aligned for reading data at a position at which file data is stored. This process is also known as a seek. Seek operations in a HDD include only movement of an arm with a head on a disk having a diameter of several centimeters, and therefore seeks may take only several tens of milliseconds at maximum to be performed. In contrast, seek operations on a magnetic tape include winding of the magnetic tape, which can have a length of over 1000 meters. Accordingly, seek operations on magnetic tape can take relatively much longer to perform than the seek operations in a HDD. When relatively large files are copied from a LTFS-based storage system to a HDD, these relatively longer seek times can add a considerable amount of time to the data copy process.

One conventional technique used in an attempt to reduce data migration times includes reducing redundant seeks by sorting out an order of files that are to be copied in advance of performing the migration. Specifically, this sorting may be made according to positions of file data stored on the tape. However, this conventional technique has disadvantages because it is unable to avoid seeks when the file is fragmented. Moreover, this conventional technique adds time to the migration process as a result of the sorting performed, and additionally calls for relatively greater and greater CPU resource as a number of target files increase. It is also difficult to predict a time for copying the data due to the difficulty of predicting the volume seeks in advance.

Various approaches described herein eliminate occurrences of redundant seeks during the copying of data from a LTFS-based storage system to a RANVM drive, as a result of the data being copied in units of blocks of the drive. By eliminating these occurrences of redundant seeks, a time for performing the copy is reduced.

Figure 11:
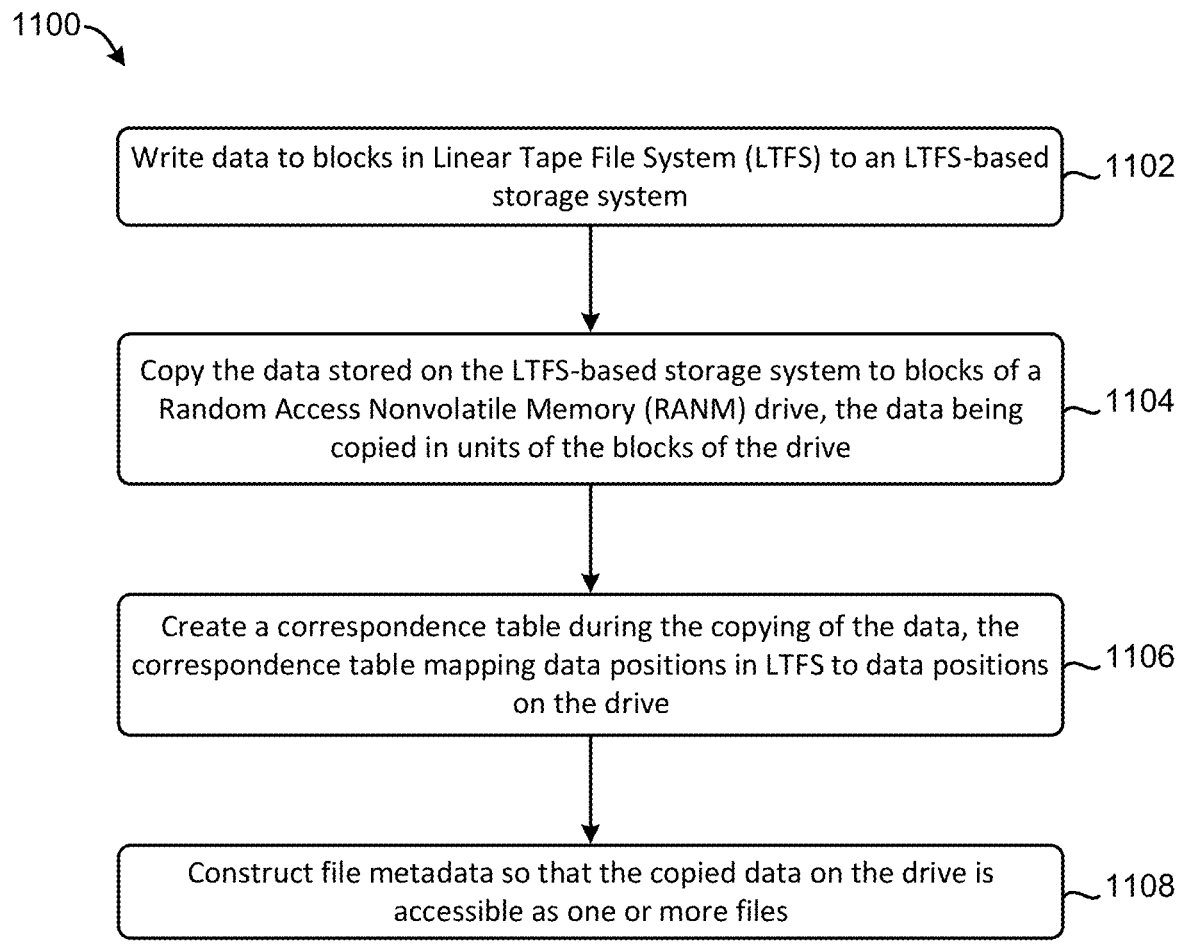
FIG. 11 is a flowchart of a method, in accordance with one approach.

Now referring to FIG. 11, a flowchart of a method 1100 is shown according to one approach. The method 1100 may be performed in accordance with the present invention in any of the environments depicted in FIGS. 1-10 and 12-15, among others, in various approaches. Of course, more or fewer operations than those specifically described in FIG. 11 may be included in method 1100, as would be understood by one of skill in the art upon reading the present descriptions.

Each of the steps of the method 1100 may be performed by any suitable component of the operating environment. For example, in various approaches, the method 1100 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 1100 may be utilized for reducing a time of migrating data from a LTFS-based storage system to a RANVM drive in units of the blocks of the drive. Accordingly, as will be described elsewhere below, method 1100 may include operations for both preparing and performing the data migration. Note that the copy of data that is migrated from the LTFS-based storage system to the drive is in preferred approaches not performed in units of files of the data because this would otherwise incur additional migration time in the seek operations performed to copy the data in units of files of the data. Accordingly, utilization of various approaches described herein result in reduced data migration times.

As noted above, LTFS is an exemplary format of a file system that may be implemented in a given tape drive library in order to enables access to compliant tapes. For context, the LTFS-based storage system of various approaches herein may be a known type of magnetic tape-based storage system, but modified according to the teachings herein. In one preferred approach, the LTFS-based storage system includes a magnetic tape drive, and possibly many tape drives in a tape library. The system may also include one or more magnetic recording tapes. Moreover, the RANVM drive may be a known type of storage drive, e.g., HDD, SSD, etc.

Method 1100 may include initially writing the data in LTFS to a LTFS-based storage system. For example, operation 1102 of method 1100 includes writing data to blocks in LTFS. In some approaches, the writing of the data to the LTFS-based storage system may be performed without having received any request and/or instruction to copy data from the LTFS-based storage system to the RANVM drive. In contrast, in some other approaches, the data may be written to the LTFS-based storage system despite there being a plan for the data written on the LTFS-based storage system to at some point be migrated to the RANVM drive.

In some approaches, the data may be written in LTFS as files, and therefore one or more write operations performed in method 1100 may include writing file data to blocks in LTFS. It may be anticipated that the data in LTFS may eventually be copied to blocks of the RANVM drive in units of blocks of the RANVM drive. Accordingly, as file data is written to the LTFS-based storage system, positions at which the file data is written to the blocks in LTFS may be managed by the LTFS-based storage system according to block numbers in a same manner as file data is managed by the RANVM drive. Note that the writing of file data to blocks in LTFS on the LTFS-based storage system is performed prior to the data being copied to the blocks of the drive, e.g., the write operations to the LTFS-based storage system may include an initial writing of the data in LTFS before there is ever a request to copy/migrate the data to the RANVM drive. In some approaches, the file data written to blocks on the LTFS-based storage system may include file data of multiple files. In some other approaches, the file data written to blocks on the LTFS-based storage system may include file data of a single file.

Based on metadata that includes positional information about the file data being indexed on the LTFS-based storage system in some approaches, the locations of the data files, e.g., such as on a magnetic recording tape of the LTFS-based storage system, are known despite the positions of file data being managed during the writing of the data to blocks on the LTFS-based storage system according to block numbers in a same manner as file data is managed by the drive. In other words, the writing of data files to blocks on the LTFS-based storage system according to block numbers in a same manner as file data is managed by the drive, preferably does not impair the performance of the LTFS-based storage system. As will be described in greater detail elsewhere below, managing writing positions at which the file data is written to the blocks on the LTFS-based storage system in such a way enables all of the file data to be copied from the LTFS-based storage system to the RANVM drive without having to perform seeks on the magnetic recording tape in the LTFS-based storage system (except perhaps an initial seek to find the start of data in a given data band on the magnetic recording tape), and without having to otherwise format the writes on the drive to conform to blocks of the drive. As a result, the file data may be copied from the LTFS-based storage system to the drive in significantly less time than an amount of time that would be consumed if copying the file data from the LTFS-based storage system to the drive included performing data seeks. For example, each avoided seek operation may reduce a time of the copy process by up to approximately several tens of seconds.

A boundary of the file data may in some approaches be aligned to a size of the blocks on the drive, e.g., a scheduled size of the blocks on the drive, during the writing of the file data to blocks on the LTFS-based storage system. Note that this alignment may be ensured based on the management of positions at which the data is written to the blocks on the LTFS-based storage system described directly above. The boundary of the file data may be defined by one or more positions and/or characteristics of the file data, depending on the approach. For example, in one preferred approach, the boundary of the file data includes a beginning of at least a portion of the file data. In another approach, the boundary of the file data may include an end of at least a portion of the file data.

For context, the size of the blocks on the drive may depend on the approach. As previously noted, this size may preferably be incorporated into the management of positions at which the data is written to the blocks on the LTFS-based storage system. In some preferred approaches, the size of the blocks on the drive may be related to a size of blocks on the LTFS-based storage system. For example, during the writing of the data to the LTFS-based storage system, a size of each of the blocks on the LTFS-based storage system may, in some preferred approaches, be an integer multiple of a size of one of the blocks of the drive. The integer multiple may be set by, e.g., an administrator of the LTFS-based storage system, an administrator of the drive, by a manufacturer of one or more components of the LTFS-based storage system and/or by a manufacturer of one or more components of the dive, a table, etc. Said another way, the size of one of the blocks on the LTFS-based storage system and the size of one of the blocks of the drive may establish a block size ratio. For example, in one approach, the block size ratio may be a quotient of the size of one of the blocks on the LTFS-based storage system and the size of one of the blocks of the drive. One preferred block size ratio may be four, i.e., one block of the LTFS-based storage system corresponds to four blocks on the drive. Note that the block size ratio and the integer multiple may be interchangeable, e.g., the integer multiple and the block size ratio in the preceding example are both four. In some other approaches, the integer value may be a different value, e.g., one, ten, one-hundred, a fraction, a nearest integer multiple where the block size ratio is not a whole number, etc.

Management of the positions at which the file data is written to the blocks on the LTFS-based storage system may in some approaches additionally and/or alternatively include adjusting a block offset, e.g., a byte offset, of the file data on the LTFS-based storage system. For example, in some approaches, the block offset of the file data on the LTFS-based storage system may be adjusted such that a remainder of a quotient of the block offset and the size of one of the blocks of the drive becomes equal to the remainder of a quotient of an offset, e.g., a file offset, of the file data on the LTFS-based storage system and the size of one of the blocks of the drive. This adjustment of block offsets may be applied to cope with issues that would otherwise be presented in copying data from the LTFS-based storage system where the data is stored in at least one shared block, e.g., such as where a block on the LTFS-based storage system includes data of a first data file and data of a second data file. Specifically, the adjustment may align a data boundary to a block size of the file system on the drive when file data is written on the LTFS-based storage system.

Operation 1104 of method 1100 includes copying data stored on the LTFS-based storage system to the blocks of the RANVM drive. The data may preferably be copied in units of the blocks of the drive. More specifically, the data may not be copied from the LTFS-based storage system to the drive in units of files of the data, as doing so may add to the total time of copying the data. This is because otherwise copying the data from the LTFS-based storage system to the drive in units of files of the data would utilize data seek operations being performed which would ultimately increase the time required to perform the data copy. In some approaches, a magnetic recording tape of the LTFS-based storage system is not mounted during the copying, e.g., unusable from an application. Although the file system on the RANVM drive may be mounted during the copying, e.g., usable from an application, there is preferably a sufficient amount of free space on the drive to copy all the data recorded on the LTFS-based storage system. Accordingly, in one optional approach, method 1100 may include determining a size of file that is to be copied prior to performing the copy. Such a determination may in some approaches be made, e.g., based on a length of a magnetic recording tape of the LTFS-based storage system where the entire length of the tape may be assumed to include data, based on a length of a portion of the tape that data is being copied from where the entire length of the portion of the tape may be assumed to include data, based on a size of an index of a tape of the LTFS-based storage system, based on known techniques, etc. The determined size of file that is to be copied may be compared with a determined size of free space on the drive. In response to a determination that the determined size of file that is to be copied is greater than a determined size of free space on the drive, copying data from the LTFS-based storage system to the drive may be, e.g., delayed, partially performed, performed on more than one medium of more than one RANVM drive, etc. By ensuring that the size of file that is to be copied is equal to or less than a determined size of free space on the drive, known types of errors associated with running out of available free space on the drive are avoided.

In some approaches, the data copied to the blocks of the drives may include all of the data on the LTFS-based storage system. For example, in some approaches, the data copied to the blocks of the drive includes all data stored between a first end of a magnetic recording tape of the LTFS-based storage system and a second end of the magnetic recording tape of the LTFS-based storage system. In another approach, the data copied to the blocks of the drives may include only some of the data of the LTFS-based storage system. For example, in some approaches, the data copied to the blocks of the drive may include data stored, e.g., on a plurality of predetermined portions of the LTFS-based storage system that are located between a first end of the magnetic recording tape and a second end of the magnetic recording tape, data on predetermined blocks on the magnetic recording tape, data stored on one or more data tracks of a predetermined data band of the magnetic recording tape, predetermined sub-portions of the magnetic recording tape used for performing a known type of rollback to a previous state of the magnetic recording tape, etc.

Although various approaches herein state that data is copied from the LTFS-based storage system to blocks of the RANVM drive, whether the "data" includes valid data and/or invalid data may depend on the approach. LTFS is a write-once type file system, in which recorded blocks on a magnetic recording tape of the LTFS-based storage system are not rewritten in overwriting a file and data to overwrite is added to the file. As such, in LTFS, block data may be divided at any boundary, e.g., any offset, due to overwriting of a file, as invalid area may be created on a block on the LTFS-based storage system. Meanwhile, a general file system on the RANVM drive, e.g., such as the general file system on a HDD, may not include a mechanism to handle an area in a copied block marked as invalid, and therefore the RANVM drive may be unable to handle data containing such a block properly as a file . . . . However, various approaches described herein are configured to enable coping with the issue of handling the overwritten file. This is because, various approaches described herein include performing boundary adjustments during the writing of data files to blocks on a LTFS-based storage system, e.g., the boundary of the file data may be aligned to the size of the blocks on the drive during the writing of the file data to blocks on the LTFS-based storage system, the boundaries of the file data may be aligned to the size of the blocks on the drive during the writing of the file data to blocks on the LTFS-based storage system, etc. Accordingly, in some approaches, the LTFS-based storage system may include at least some invalid data, and therefore the data copied from the LTFS-based storage system to blocks of the RANVM drive may include at least some invalidated data, e.g., the invalid data resulting from overwriting operations performed on the LTFS-based storage system. However, in some other approaches, the data copy operation may include copying only valid data from the LTFS-based storage system to blocks of the RANVM drive based on the invalid data being located on portions of the magnetic recording tape that are not addressed by the data copy operation. For example, invalid data is not copied during the data copy operation in an approach in which only data stored on at least one data track of a predetermined data band of the magnetic recording tape is copied from the LTFS-based storage system to blocks of the RANVM drive, and the predetermined data tracks do not include any invalid data. In yet some further approaches, the LTFS-based storage system may include only valid data, e.g., where no data has been deleted or overwritten, and therefore, the data copy operation may include copying only valid data from the LTFS-based storage system to blocks of the RANVM drive.

As briefly noted elsewhere above, in some approaches, no data seek operations are performed on the LTFS-based storage system during the copying of the data to the blocks of the drive. More specifically, in some approaches, during the copying, no seek operations may be performed, e.g., to determine the start location of an instance of data that is copied, to determine the end location of an instance of data that is copied, to determine the locations of split data and/or a fragmented data file on a tape of the LTFS-based storage system, etc. Not performing these seek operations, which would have otherwise been performed if the data on a tape of the LTFS-based storage system was copied to the RANVM drive in units of files of the data, reduces a time that the process of copying the data from the LTFS-based storage system to blocks of the RANVM drive takes. It should be noted that such copying data from a LTFS-based storage system to blocks of an RANVM drive in units of the blocks of the drive and not in units of files of the data has not been considered in conventional data migration techniques. Recall that, as described elsewhere above, such conventional migration techniques have utilized sorting an order of files that are to be copied in advance of a data migration in an attempt to reduce seek times during the data migration. However, this process is unable to avoid seeks when the file is fragmented, increases the migration time as a result of the sorting performed and moreover, consumes a relatively greater amount of CPU resource as a number of target files increases. In sharp contrast, by various approaches herein anticipating such a migration from a LTFS-based storage system to blocks of an RANVM drive, the data may be written to blocks on the LTFS-based storage system in a manner that mitigates at least some of the seek operations that are otherwise performed in conventional migration techniques. Accordingly, the inventive discoveries disclosed herein with regards to copying data from a LTFS-based storage system to blocks of an RANVM drive in units of the blocks of the drive and not in units of files of the data proceed contrary to conventional wisdom.

Operation 1106 of method 1100 includes creating a correspondence table during the copying of the data from the LTFS-based storage system to blocks of an RANVM drive. The correspondence table preferably maps data positions in LTFS to data positions on the drive, and may be shared with the LTFS-based storage system and/or the drive, e.g., shared with a controller of the LTFS-based storage system, shared with a controller of the drive, shared with a processor of the LTFS-based storage system, shared with a processor of the drive, etc. In some approaches, creating the correspondence table may include collecting information associated with the management of the positions at which the file data is written to the blocks on the LTFS-based storage system. For example, the information may include, e.g., block offset information, block offset adjustment information, file data, file data boundary information, block size information, data validity information, LTFS formatting information, etc., which may be added to the correspondence table. In some approaches, the information may additionally and/or alternatively include one or more known types of data positional information.

Subsequent to copying the data on the LTFS-based storage system to blocks of the RANVM drive, at some point, invalid data may be deleted from the blocks of the drive, e.g., overwritten, erased, marked as a reclaimable storage write location, etc. In some approaches, data correspondence information may be used for scheduling and/or performing the deletions on recording media of the LTFS-based storage system and/or on recording media of the drive. The deletion of invalid data from the blocks of the drive increases the available storage space of the drive.

In operation 1108 of method 1100, file metadata, e.g., file block allocation, is constructed on the drive so that the copied data on the drive is accessible as one or more files, e.g., accessible as one or more files on the drive. In some approaches, the file metadata may be directory entries that point to one or more start blocks in a FAT, e.g., see FIG. 13E, which illustrates an example of constructing metadata. Metadata other than block allocation, e.g. file name, may in one approach be copied from a LTFS-index. In another approach, block allocation may be constructed from a correspondence table that includes data positions on blocks on a LTFS-based storage system and data positions on a drive, e.g., see correspondence table 1230 of FIG. 12. It should be noted that in conventional approaches, data copied from a LTFS-based storage system to a drive cannot be accessed as one or more files on the drive without performing various seek operations during the copying of the data. This is because conventional approaches do not consider copying data from a LTFS-based storage system to a RANVM drive in units of blocks of the drive. In sharp contrast, the conventional approaches undertake timely seek operations in order to copy the data from the LTFS-based storage system to the drive in units of files of the data on the LTFS-based storage system. Accordingly, as a result of the techniques of various approaches described herein avoiding seek operations during the copying of data from a LTFS-based storage system to a RANVM drive in units of blocks of the drive, the time for copying the data from the LTFS-based storage system to the RANVM drive is relatively more efficient than conventional data copy techniques.

FIGS. 12-14F depict states of data being copied from a LTFS-based storage system to a RANVM drive not in units of files but in units of blocks of the drive, e.g., without using an Application Programming Interface (API) of a file system). Moreover, file metadata, e.g., file block allocation, may be constructed on the drive so that a copied block is able to be treated as a file on the drive. In some approaches, data is copied from end to end of the tape in units of blocks, whereby no seek is required to be performed during the copying of the data. LTFS also manages the position at which file data is recorded according to the block number in the same manner as the general file system on the drive. This copying of data is available based on the enabling of mapping block numbers on the LTFS-based storage system to block numbers of the file system on the destination drive. In some approaches, the data is copied from the LTFS-based storage system to the RANVM drive while a correspondence table is created, e.g., to map the data position in LTFS to the data position on the drive. Moreover, this copying of the data may be enabled by aligning the data boundary to the block size of the file system on the drive when writing file data to blocks in LTFS to a LTFS-based storage system.

As a precondition of various approaches described herein, a block size of each of the blocks in LTFS (hereinafter, referred to as "LBS" which is the LTFS Block Size) may be an integer multiple of a block size of the file system on the destination drive (hereinafter, referred to as TBS: Target Block Size). In some approaches, the integer multiple of the block size of the file system on the destination drive, which may be a value obtained by dividing the LBS by the TBS, may hereinafter be referred to as "BSR" which is the Block Size Ratio. It should be noted that the source LTFS is in some preferred approaches not mounted during the copying, e.g., unusable from an application. Although the file system on the destination drive may be mounted, e.g., usable from application, and there is preferably a sufficient amount of free space to copy all the data recorded in the source tape.

Figure 12:
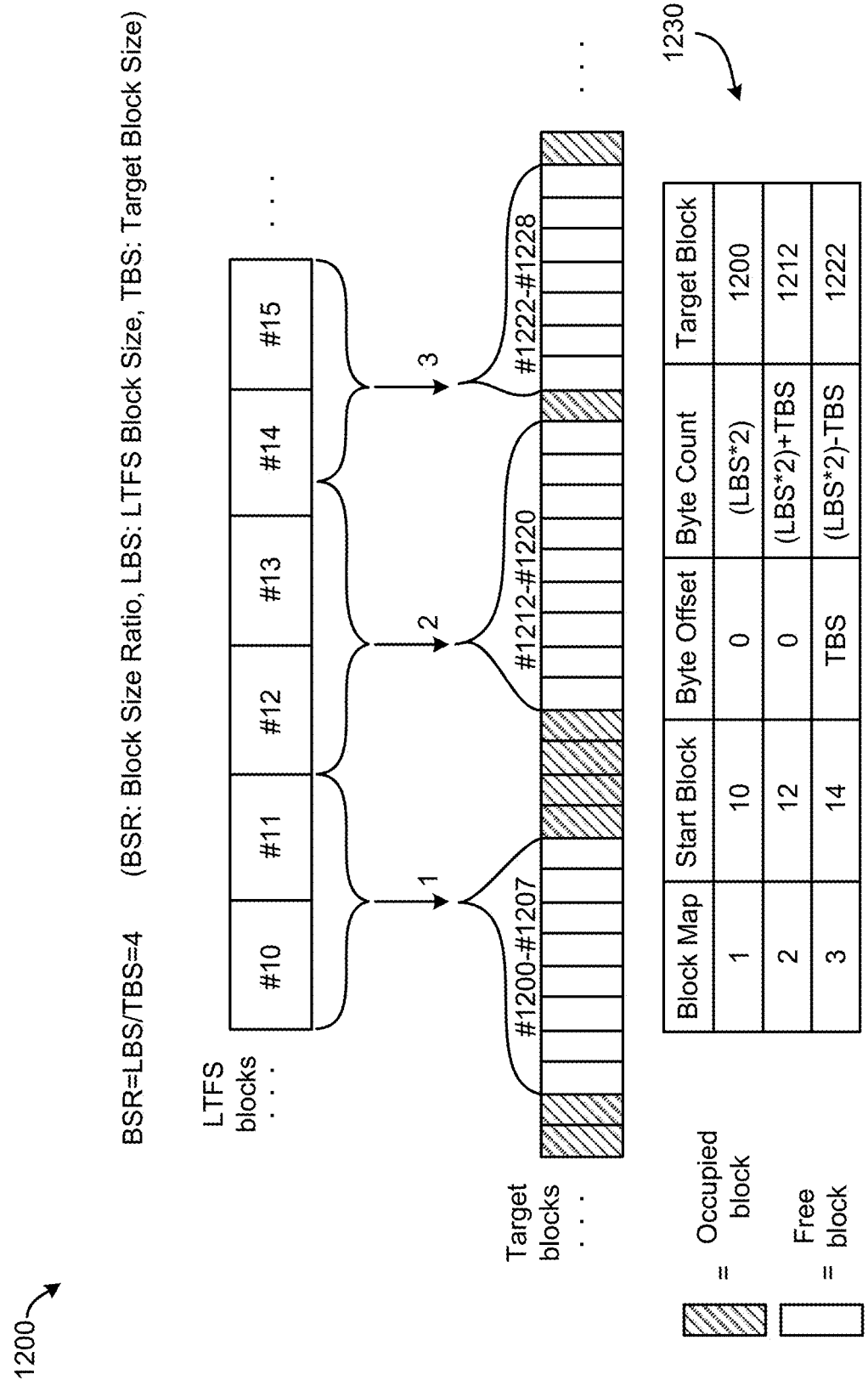
FIG. 12 is a representation of a state of copying data from a LTFS-based storage system to blocks of an RANVM drive, in accordance with one approach.

FIG. 12 depicts a state 1200 of copying data from a LTFS-based storage system to blocks of an RANVM drive, in accordance with one approach. As an option, the present state 1200 may be implemented in conjunction with features from any other approach listed herein, such as those described with reference to the other FIGS. Of course, however, such state 1200 and others presented herein may be used in various applications and/or in permutations which may or may not be specifically described in the illustrative approaches listed herein. Further, the state 1200 presented herein may be used in any desired environment.

The state 1200 of FIG. 12 includes a representation of a plurality of blocks on a LTFS-based storage system, e.g., see LTFS blocks #10-#15, and a representation of a plurality of target blocks of a RANVM drive, e.g., see Target blocks #1200-#1207, Target blocks #1212-#1220 and Target blocks #1222-#1228. A correspondence table 1230 is also included in FIG. 12 for a contextual reference detailing the copying of data from the LTFS-based storage system to the RANVM drive.

The data of the LTFS-based storage system is copied to the RANVM drive not in units of files, but in units of blocks of the drive, e.g., the Target blocks. In some approaches, data on the LTFS-based storage system is read into the memory in units of multiples of the LBS. Moreover, data read into the memory may be written in free blocks on the drive in units of multiples of the TBS.

Note that, prior to copying the data, free blocks on the drive that are to be utilized during for the copying may be set to be unusable from applications, e.g., using one or more known techniques for creating a special file inaccessible from applications and allocating required free blocks to the special file. However, in some approaches, these blocks may be realized by the applications despite the applications being prevented from using the blocks.

With continued reference to FIG. 12, it may be assumed that the BSR is four and therefore the data of one block on the LTFS-based storage system may be copied to four free blocks on the drive. According to a more specific example, based on the BSR of four, the two LTFS blocks #10 and #11 on the LTFS-based storage system are illustrated being copied in units of the blocks of the drive. For example, copy operation 1 includes copying the data of LTFS blocks #10-#11 to eight blocks #1200-#1207 of the drive. According to another example, copy operation 2 includes copying the data of LTFS blocks #12-#13 and data of a portion of LTFS block #14 to nine blocks of the drive, e.g., blocks #1212-#1220. According to yet another example, copy operation 3 includes copying the data of a portion of LTFS block #14 and the data of LTFS block #15 to seven blocks of the drive, e.g., blocks #1222-#1228.

Data positions on blocks on the LTFS-based storage system and data positions on the drive are in some approaches recorded on a correspondence table 1230. The correspondence table 1230 may be used to understand which position on the drive is used to copy data at any position on the blocks on the LTFS-based storage system.

To realize this correspondence table 1230, there may be an issue with regards to shared blocks which is a unique property of LTFS. LTFS uses a larger block size than the general file system to efficiently read and/or write data from and/or to the tape. For example, a recommended LBS value in one approach is 512 kilobytes (KBs) however the LBS may be assumed to be 256 KB in various approaches described herein for purposes of clearly viewing the illustrations shown in various of the FIGS. However, depending on the approach, the LBS may be configured to any value, e.g., 128 KB, 64 KB, 1024 KB, etc. For relatively efficient use of tape capacity in a large block size, the LTFS-based storage system may store data of several files in one block as opposed to the general file system on the drive. This practice may also be called a shared block. Techniques for copying data stored on a LTFS-based storage system to blocks of a RANVM drive in units of blocks of the drive, where at least some of the data on the LTFS-based storage system is stored in shared blocks, is further described elsewhere herein, e.g., see FIGS. 13A-13B.

Figure 13A:
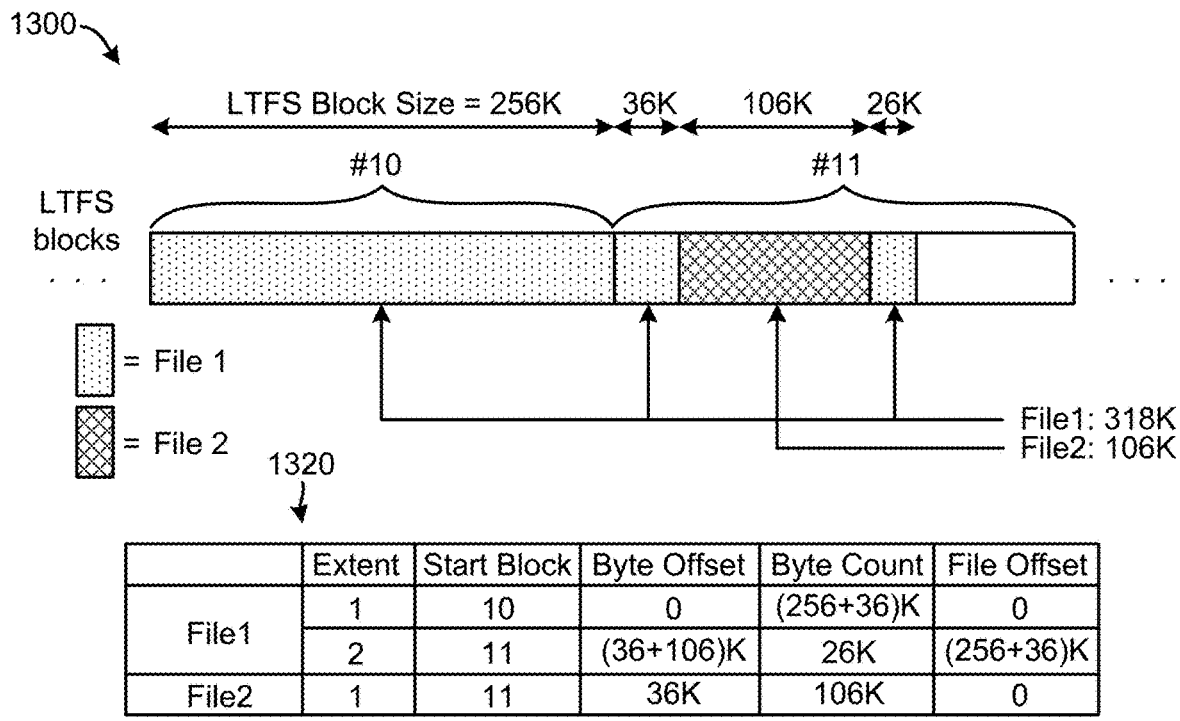
FIG. 13A depicts a state of a LTFS-based storage system and a correspondence table, in accordance with one approach.
Figure 13B:
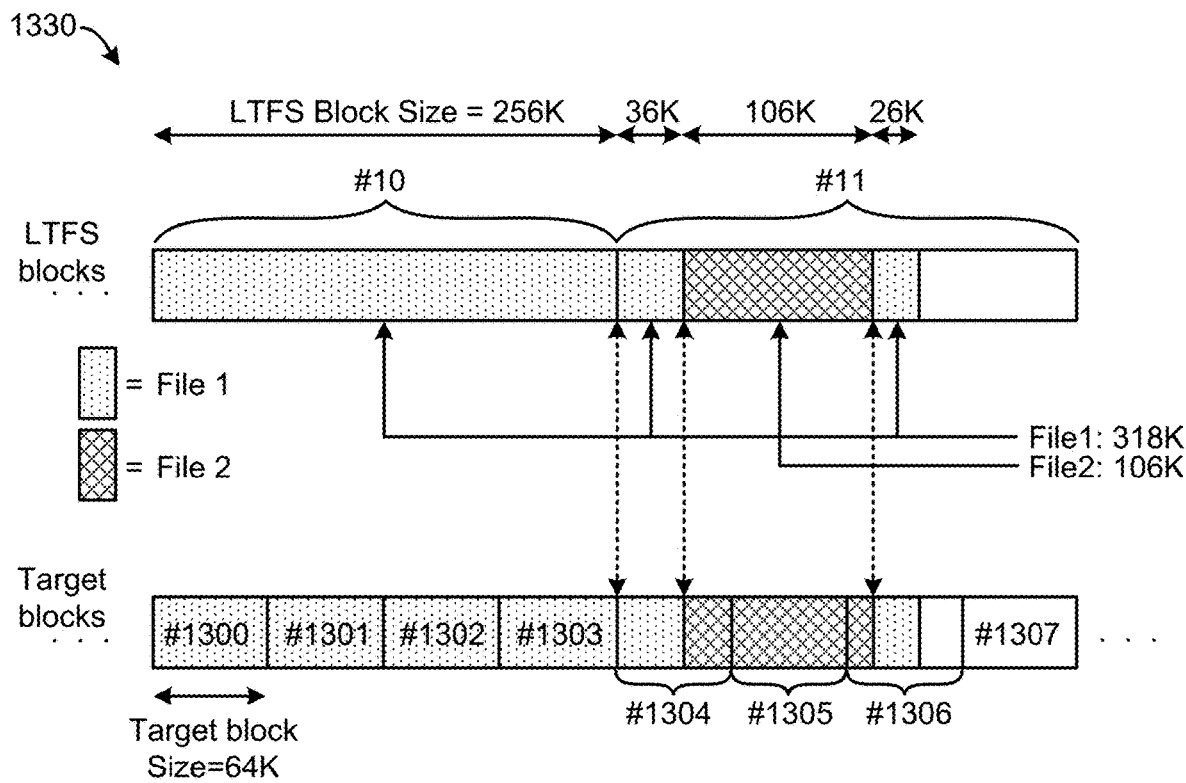
FIG. 13B depicts a state of copying data from the LTFS-based storage system of FIG. 13A to blocks of an RANVM drive.
Figure 13C:
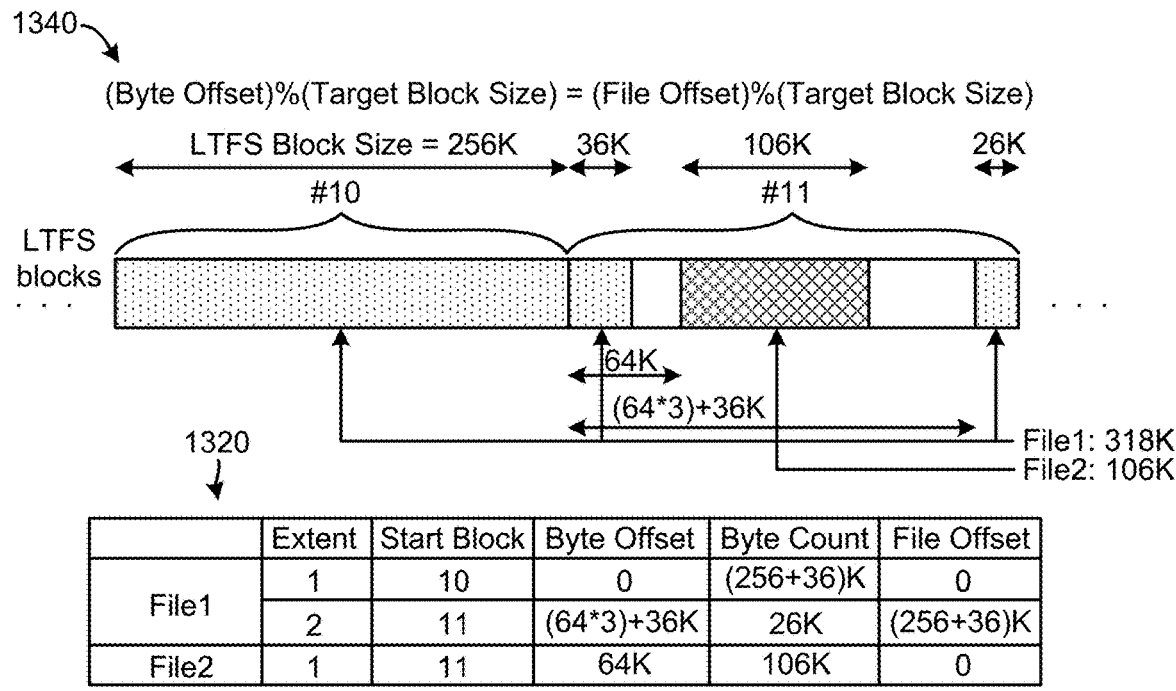
FIG. 13C depicts a state of the LTFS-based storage system of FIGS. 13A-13B and the correspondence table of FIG. 13A.
Figure 13D:
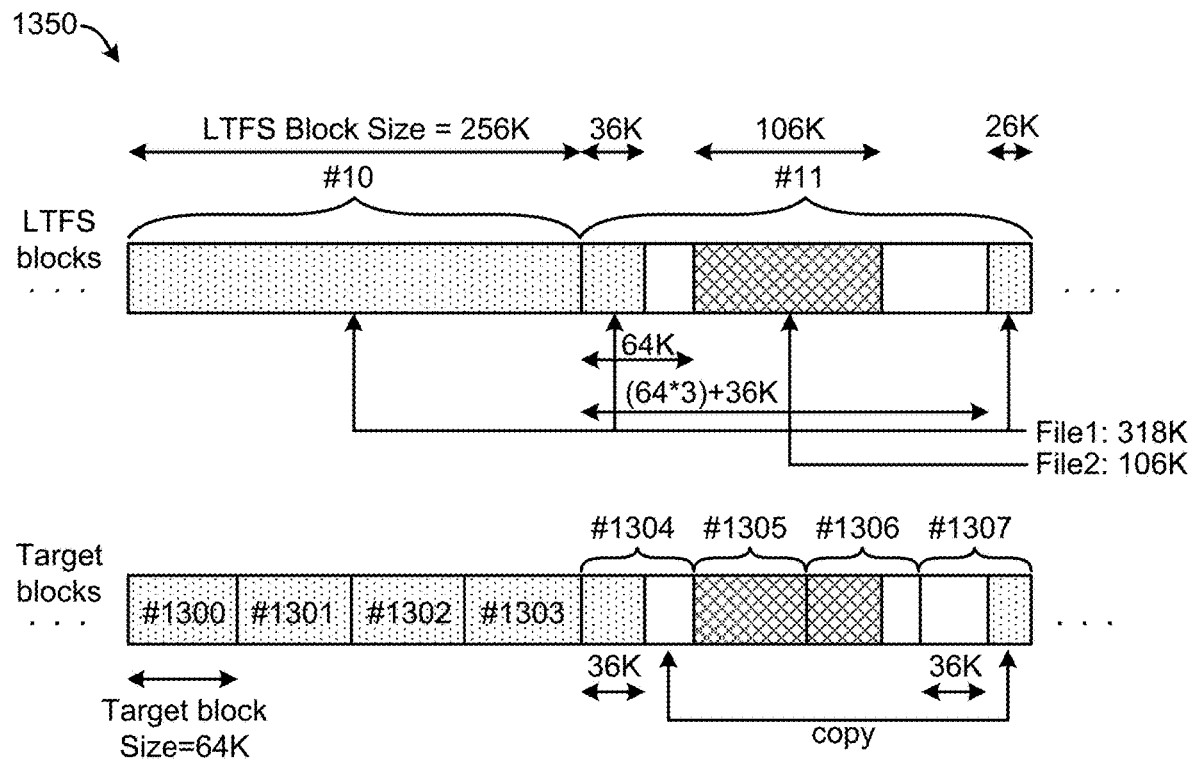
FIG. 13D depicts a state of copying data from the LTFS-based storage system of FIGS. 13A-13C to blocks of the RANVM drive of FIG. 13B.
Figure 13E:
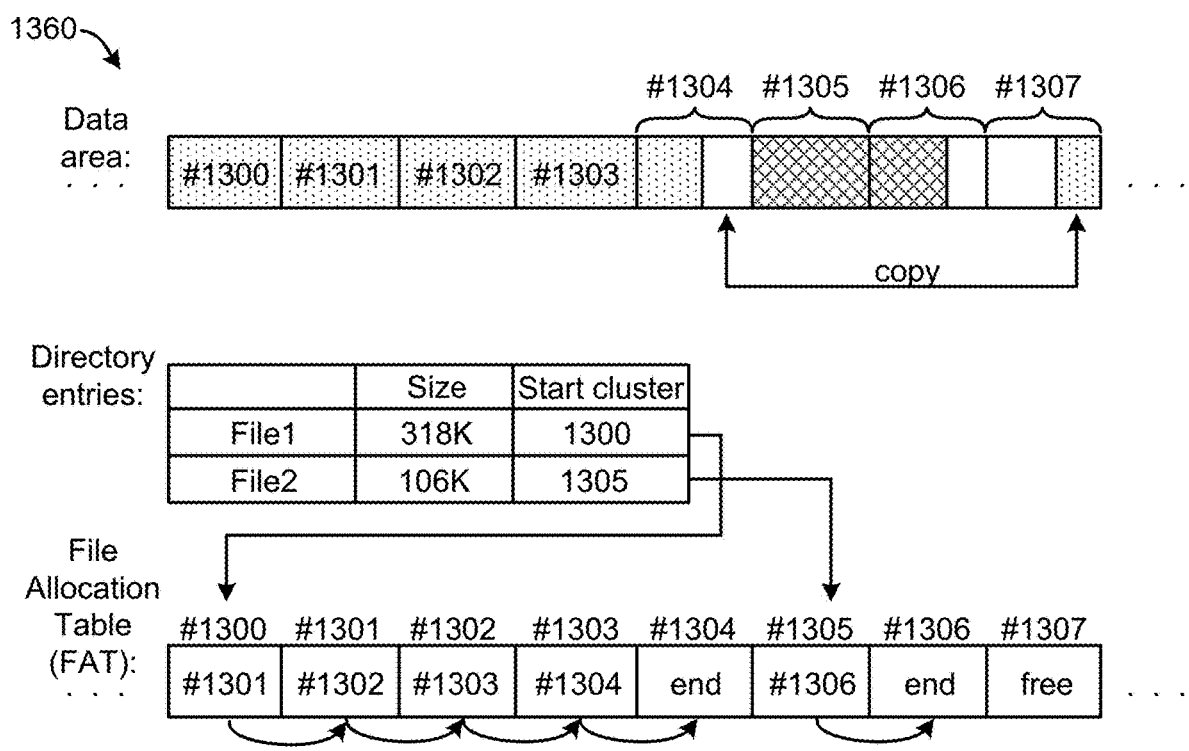
FIG. 13E depicts a state of copying data from the LTFS-based storage system of FIGS. 13A-13D to a destination file system that is a File Allocation Table (FAT).

FIGS. 13A-13B depict states 1300, 1330 that include issues based on shared LTFS blocks, during copying data stored on a LTFS-based storage system to blocks of a RANVM drive in units of blocks of the drive, in accordance with one approach. FIGS. 13C-13E depict states 1340, 1350, 1360 that mitigates the issues of FIGS. 13A-13B, during copying data stored on a LTFS-based storage system to blocks of a RANVM drive in units of blocks of the drive. As an option, the present states 1300, 1330, 1340, 1350, 1360 may be implemented in conjunction with features from any other approach listed herein, such as those described with reference to the other FIGS. Of course, however, such states 1300, 1330, 1340, 1350, 1360 and others presented herein may be used in various applications and/or in permutations which may or may not be specifically described in the illustrative approaches listed herein. Further, the states 1300, 1330, 1340, 1350, 1360 presented herein may be used in any desired environment.

Referring first to FIG. 13A, the state 1300 includes a representation of a plurality of blocks on a LTFS-based storage system, e.g., see LTFS blocks #10-#11. The state 1330 of FIG. 13B, illustrates data being transferred from the blocks of the LTFS-based storage system to a plurality of Target blocks of a RANVM drive in units of the Target blocks of the drive, e.g., see Target blocks #1300-#1307.

With reference again to FIG. 13A, the state 1330 illustrates an example of a shared LTFS block on a LTFS-based storage system. For example, it may be noted that the LTFS block #11 includes two portions of a first file, e.g., File1, and an entirety of a second file, e.g., File2. In LTFS, file data positions are managed as a list of extents. Note that the LTFS blocks of the state 1300 are reproduced in the state 1330. In some approaches, the list of extents may be stored in a correspondence table, e.g., such as correspondence table 1320. One extent may represent one continuous data. In some approaches, an extent may include a start block number, e.g., see Start Block, a block start offset, e.g., see Byte Offset, a continuous data length, e.g., see Byte Count, and a file extent position, e.g., see File Offset.

As mentioned above, in FIGS. 13A-13B, LTFS block #11 is shared by File1 and File2. In the current approach, stored data of File1 includes 36 KB from a head of the LTFS block #11 and 26 KB from the offset (36+106) KB thereof. Moreover, stored data of File2 includes 106 KB from the offset 36 KB of the LTFS block #11. As such, a shared block may store data of several files according to any boundaries, e.g., with any offsets and any lengths. Meanwhile, a general file system on the RANVM drive that includes the Target blocks does not include a mechanism to process a shared block. Therefore, for approaches in which one block is shared by several files and/or for approaches in which file data is stored from a middle of a block onward, it is not feasible for the drive to handle files properly, e.g., based on the RANVM drive not including a mechanism to process the shared block. This issue is illustrated in FIG. 13B, where data of the shared LTFS block #11 on the LTFS-based storage system is copied to the Target blocks #1304-#1306 of the RANVM drive. Specifically, because there is no boundary adjustment incorporated into the data of File1 and File2 stored on the LTFS block #11 being copied to Target blocks #1304-#1306 of the RANVM drive in units of the blocks of the drive, Target blocks such as #1304 and #1306 include data which is unmanageable by the file system of the drive. Note that, in state 1330, the BSR is four and the TBS is 64 KB.

To mitigate the issues of copying data of a shared block, e.g., as shown in FIGS. 13A-13B, referring now to FIGS. 13C-13D, a data boundary may be aligned to a block size of the file system on the RANVM drive during writing of file data on the LTFS-based storage system. More specifically, a block offset, e.g., Byte Offset, may be adjusted such that a remaining left by dividing the block offset, e.g., Byte Offset, by the TBS becomes equal to the remaining left by dividing the file offset, e.g., File Offset, by the TBS. An equation that may be used for this adjustment is shown below:

(Byte Offset) % TBS=(File Offset) % TBS    Equation (1)

where "%" represents a remainder operator.

As a result of this adjustment being applied to the example shown in FIG. 13A, boundaries are established in the shared block, e.g., as shown in FIG. 13C, and data of the shared block may be copied to Target blocks of the RANVM drive as shown in FIG. 13D. In FIG. 13D, data is stored from a middle of the Target block #1307 and this data is copied to Target block #1304 so that data is manageable by the file system of the RANVM drive.

This adjustment produces redundant areas without recording file data on the magnetic tape of the LTFS-based storage system, which may be defective because a data capacity on the LTFS-based storage system is reduced. In the example of FIG. 13C, portions shown in unoccupied portions of LTFS block #11 from the offset 36K to the offset 64 K, and from the offset (64+106) K to the offset (64*3+36) K are redundant areas. However, these redundant areas also exist in the file system on the RANVM drive, and do not cause any serious issues in use of LTFS premised that data is copied to the RANVM drive. As a result of filling all the redundant areas on the magnetic tape with zero copied data, a compression function of the LTFS-based storage system drive is enabled to work effectively, whereby reduction of data capacity on LTFS-based storage system may be suppressed.

In some approaches, each of the blocks stored on the LTFS-based storage system may be copied to the RANVM drive and thereafter data positions of all the files on the LTFS-based storage system may be mapped to data positions on the drive according to the correspondence table in order to construct file metadata on the drive, whereby a copy of all the files on the LTFS-based storage system to the drive may be complete.

Referring now to FIG. 13E, the state 1360 illustrates an approach in which a destination file system, e.g., a destination file system of the data copied from the LTFS-based storage system to the drive in units of blocks of the drive, is a FAT.

FIGS. 14A-14F depict states 1400, 1410, 1420, 1430, 1440, 1450 of copying data stored on a LTFS-based storage system to blocks of a RANVM drive in units of blocks of the drive, in accordance with one approach. As an option, the present states 1400, 1410, 1420, 1430, 1440, 1450 may be implemented in conjunction with features from any other approach listed herein, such as those described with reference to the other FIGS. Of course, however, such states 1400, 1410, 1420, 1430, 1440, 1450 and others presented herein may be used in various applications and/or in permutations which may or may not be specifically described in the illustrative approaches listed herein. Further, the states 1400, 1410, 1420, 1430, 1440, 1450 presented herein may be used in any desired environment.

Figure 14A:
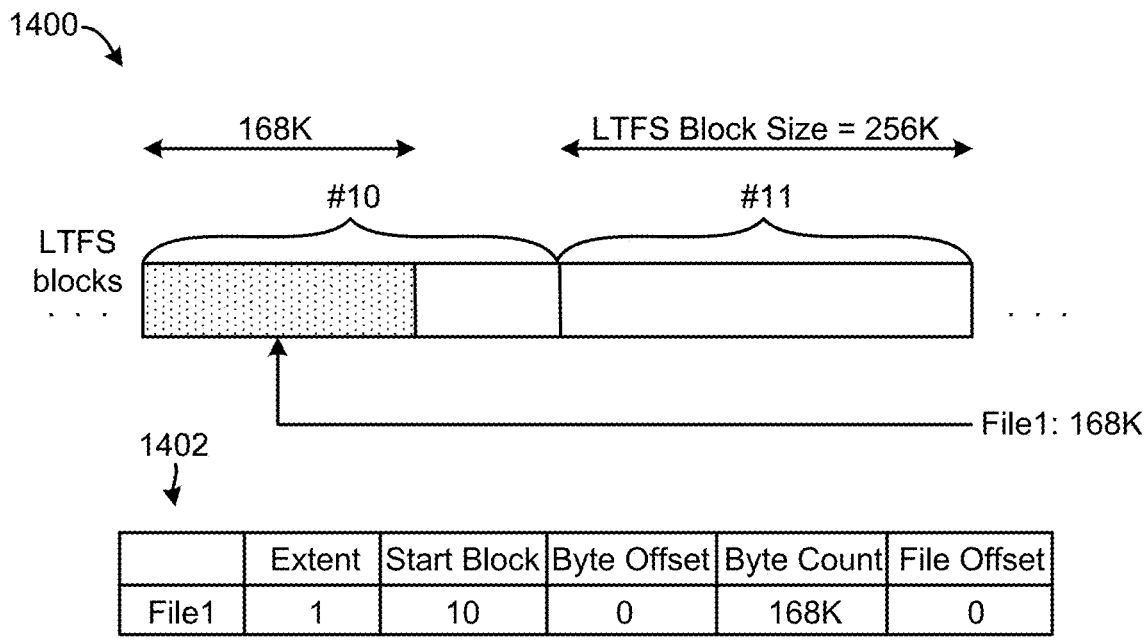
FIG. 14A depicts a state of a LTFS-based storage system and a correspondence table, in accordance with one approach.
Figure 14B:
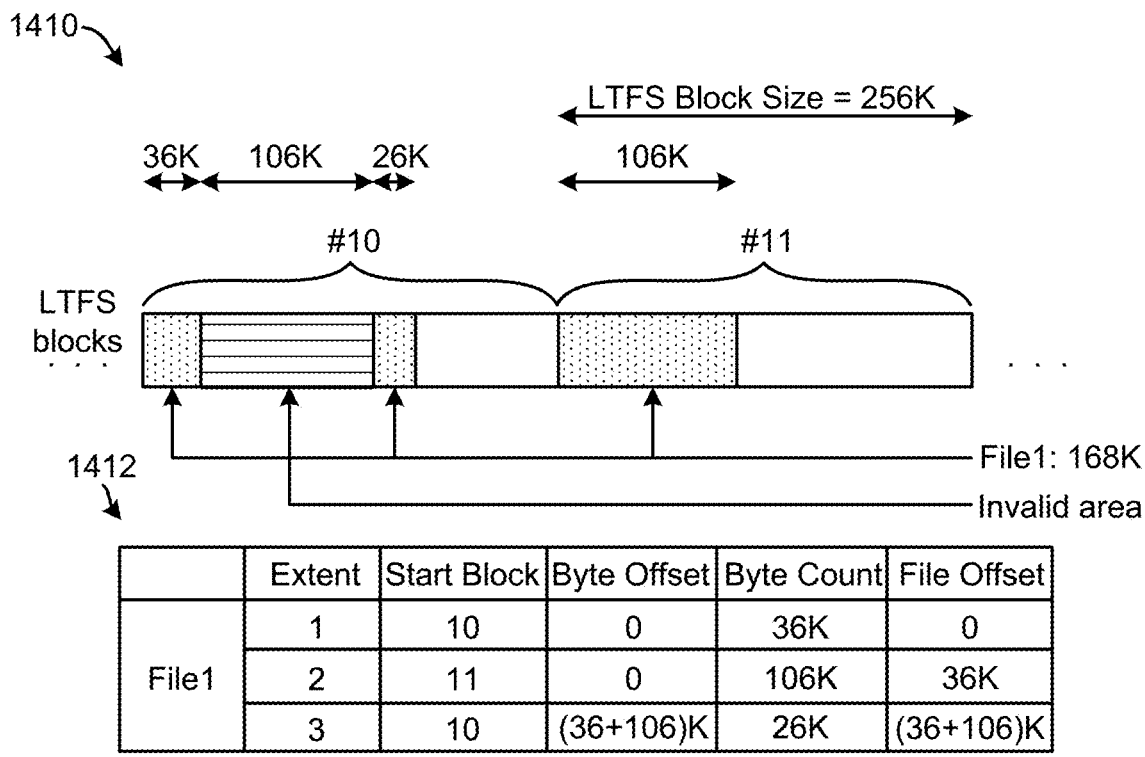
FIG. 14B depicts a state of the LTFS-based storage system and the correspondence table of FIG. 14A.
Figure 14C:
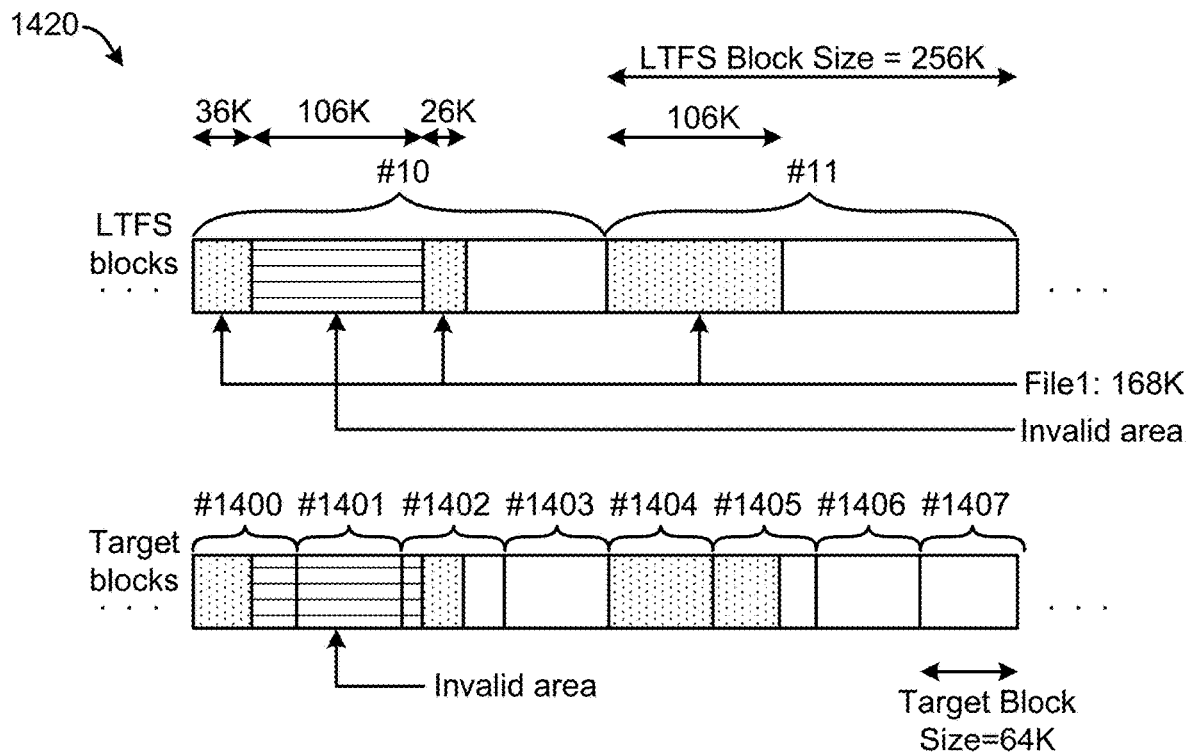
FIG. 14C depicts a state of copying data from the LTFS-based storage system of FIG. 14A to blocks of a RANVM drive.

In a similar manner as how a shared block is handled during copying of data from a LTFS-based storage system to a RANVM drive in units of the drive, e.g., see FIGS. 13A-13E, one or more particular measures may be performed in the process of copying data from a LTFS-based storage system to a RANVM drive in units of the drive where the data includes overwritten files. LTFS is a write-once type file system, in which recorded blocks on a magnetic tape are not rewritten in overwriting a file, and data to overwrite is added to the file. FIGS. 14A-14B include states 1400 and 1410 in which a file is overwritten on the LTFS-based storage system. Specifically, FIG. 14A depicts the state 1400 of a file on LTFS-based storage system before overwriting of the file. Moreover, FIG. 14B depicts the state 1410 of the file on the LTFS-based storage system after overwriting of the file. For example, when 106 KB is overwritten following 36 KB in the file recorded in an extent as shown in FIG. 14A, the extent is divided as shown in FIG. 14B and new data is added while leaving the source data on LTFS block #10. Note that the progression of the extent may also be depicted in correspondence tables, e.g., see correspondence tables 1402, 1412. As such, in the LTFS-based storage system, block data is divided at any boundary, e.g., any offset, due to overwriting of a file and an invalid area is created in the block, e.g., see Invalid area in the state 1410. Meanwhile, a general file system on RANVM drives may not have techniques to manage any area in a block that is invalid and is therefore the drive may be unable to handle data containing such a block properly as a file. FIG. 14C illustrates an example of a copy of an overwritten file block to the drive, without boundary adjustment being performed. For example, as shown in FIG. 14C, subsequent to a block containing such an invalid area being copied to the drive, blocks of the drive, e.g., such as Target block #1400 and Target block #1402, may store data which that is unmanageable by the file system may be created on the drive. Note that in FIG. 14C, the BSR is four and the TBS is 64 KB.

Figure 14D:
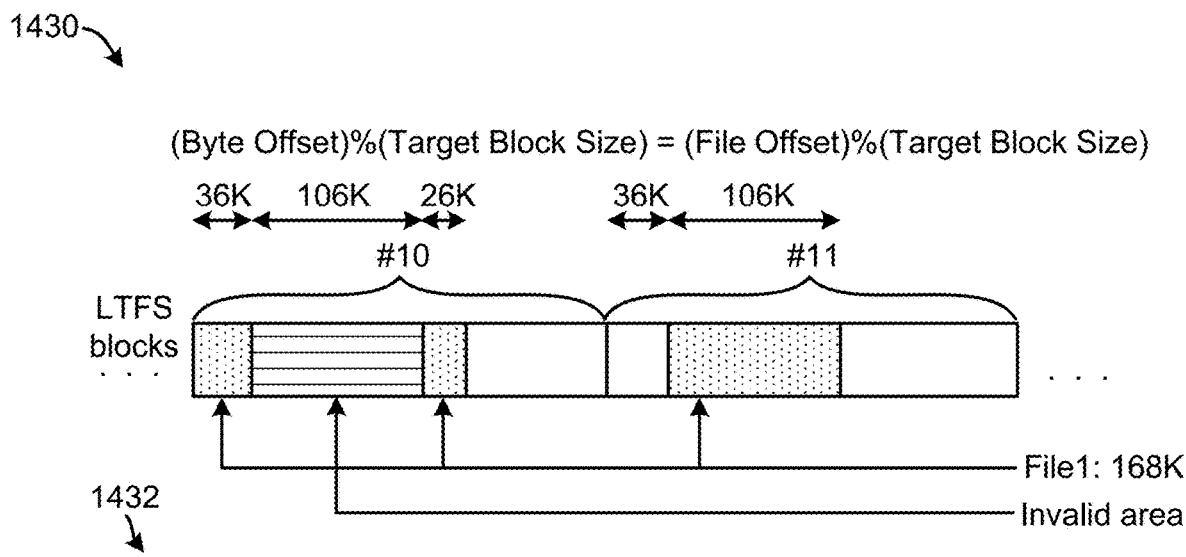
FIG. 14D depicts a state of the LTFS-based storage system of FIGS. 14A-14C and the correspondence table of FIGS. 14A-14B.
Figure 14E:
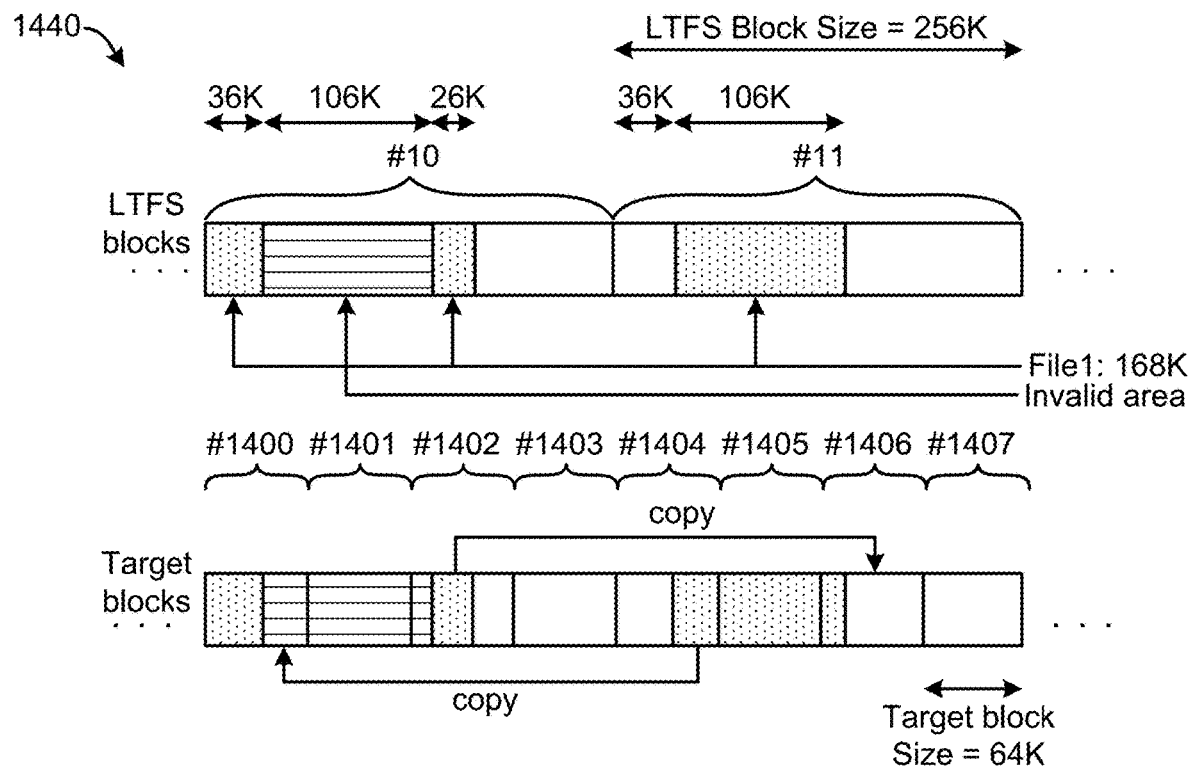
FIG. 14E depicts a state of copying data from the LTFS-based storage system of FIGS. 14A-14D to blocks of a RANVM drive.

In some approaches, boundary alignment may additionally and/or alternatively be performed for coping with issues of handling an overwritten file, e.g., thereby enabling the drive to manage any area in a block that is invalid. For example, when boundary alignment adjustment is applied to the example shown in FIG. 14B, a data boundary in the shared block is as shown in FIG. 14D, and the shared block is copied to the drive as shown in FIG. 14E. FIG. 14D includes a boundary adjustment of data to overwrite a file. FIG. 14E includes an example of a copy of an overwritten file block to the drive, e.g., with a boundary adjustment. Note that the boundaries of FIG. 14D may be depicted in a correspondence table, e.g., see correspondence table 1432. In FIG. 14E, there are invalid areas in the drive Target blocks #1400 and #1402, however, effective data is copied to the invalid areas from #1404 to #1400 as well as from #1402 to #1406, whereby data can be managed in the file system.

Figure 14F:
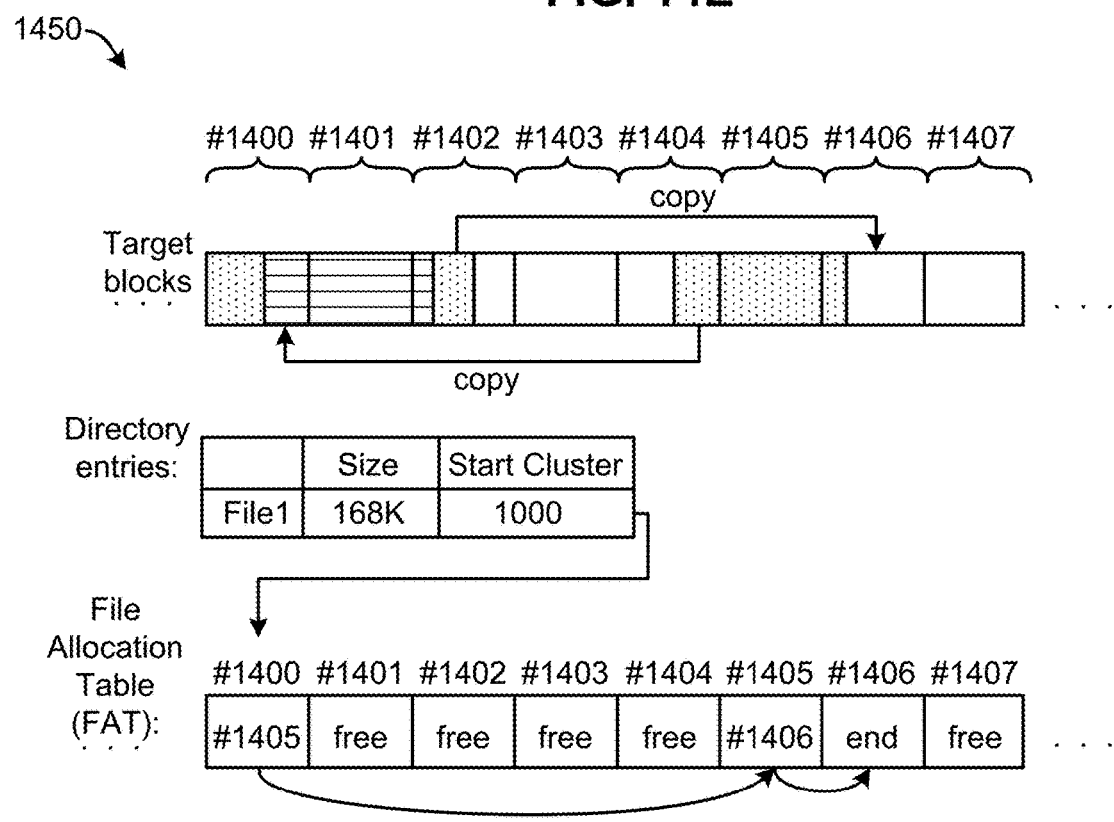
FIG. 14F depicts a state of copying data from the LTFS-based storage system of FIGS. 14A-14D to a destination file system that is a FAT.

FIG. 14F illustrates an example of a case in which the destination file system is a FAT. Specifically, the state 1450 illustrates the FAT being the destination of data of the drive Target blocks #1400-#1407.

FIG. 15 depicts a sample of pseudocode 1500 for constructing file block allocation on a destination file system, in accordance with one approach. As an option, the present sample of pseudocode 1500 may be implemented in conjunction with features from any other approach listed herein, such as those described with reference to the other FIGS. Of course, however, such sample of pseudocode 1500 and others presented herein may be used in various applications and/or in permutations which may or may not be specifically described in the illustrative approaches listed herein. Further, the sample of pseudocode 1500 presented herein may be used in any desired environment.

In one approach, the sample of pseudocode 1500 is an algorithm to copy data on a LTFS-based storage system to a destination RANVM drive in units of blocks of the drive, and then construct file metadata, e.g., file block allocation, on the destination file system. Specifically, LB_TO_TB may serve as a function to return a block number on the destination drive that corresponds to a designated block number and a position from the block head on the LTFS-based storage system. TB_COPY may serve as a function to copy a designated area of the designated block to designate another block on the destination drive. TB_ALLOC may serve as a function to allocate a designated block list for a designated file in the destination file system.

Although the LTFS specification may allow any file area to be written according to any size, e.g., for example in FIG. 14B, Byte Count of Extent 2 is rewritten to 106±α and File Offset of Extent 3 is rewritten to 36+106±α), various approaches described herein do not handle such overwriting. More specifically, FIG. 14B illustrates 106K of old data at a file offset of 36K overwritten by 106K of new data. By Portable Operating System Interface (POSIX), 106K of old data may be overwritten only by 106K of new data. However, by the LTFS-Specification, 106K of old data can be overwritten by any size of new data. For example, 106K of old data can be overwritten by 110K of new data. Note that in this example, α=+4K. Even though overwriting is possible in the LTFS specification, it may not be possible in a general file system API, e.g., such as Portable Operating System Interface (POSIX). Accordingly, some approaches described herein may function without handling such overwriting.

A tape with data written by applying techniques described elsewhere herein may not deviate from LTFS specifications, and therefore data may be read and written therein by LTFS to which various approaches described herein may not be applied. However, in a tape with data written by LTFS to which such approaches are not applied, there may be no data boundary adjustment, and it is therefore may not be possible to copy data to the drive according to some techniques described herein. Hence, techniques may be called for to easily distinguish whether data is written in a tape exclusively by LTFS. Although techniques that are utilized to realize the ability for achieving such distinguishment may vary among approaches described herein, this may be realized by updating, for example, an extended attribute value of a specific hidden file by LTFS index generation number. A LTFS index may be updated upon data being written on the LTFS-based storage system. An index generation number included in the index may also be updated in some approaches. When a LTFS-based storage system to which techniques of various approaches described is applied writes an index in a tape, an extended attribute value of the specific hidden file may be updated by an index generation number. However, if an extended attribute value of the specific hidden file is determined to be different from an index generation number when the index is read from the tape, subsequent extended attribute values of the specific hidden file may be unchanged. This technique may be used to determine whether various techniques described herein are applicable to copy data from tape to a drive where the data is copied in units of the blocks of the drive. In response to a determination that such techniques are applicable, a copy may be created using various techniques described herein. However, in some other approaches, in response to a determination that such techniques are not applicable, the copy may be created using other known techniques, however, seek time will be incurred using these known techniques.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
copying data stored on a Linear Tape File System (LTFS)-based storage system from the LTFS-based storage system to blocks of a Random Access Nonvolatile Memory (RANVM) drive,
wherein the data is copied in units of the blocks of the drive,
wherein the data includes file data,
wherein positions at which the file data is written to blocks on the LTFS-based storage system is managed by the LTFS-based storage system according to block numbers in a same manner as file data is managed by the drive.

2. The computer-implemented method of claim 1, wherein the data is stored on the LTFS-based storage system in blocks, wherein a size of each of the blocks on the LTFS-based storage system is an integer multiple of a size of one of the blocks of the drive, wherein the blocks of the drive are of a file system of the drive.

3. The computer-implemented method of claim 1, wherein the data copied to the blocks of the drive includes all data stored between a first end of a magnetic recording tape of the LTFS-based storage system and a second end of the magnetic recording tape, wherein no data seek operations are performed on the magnetic recording tape during the copying of the data thereon to the blocks of the drive.

4. The computer-implemented method of claim 1, comprising: creating a correspondence table during the copying of the data, wherein the correspondence table maps data positions in LTFS to data positions on the drive.

5. The computer-implemented method of claim 1, wherein the data is stored on the LTFS-based storage system in blocks, wherein a boundary of the file data is aligned to a size of the blocks on the drive during writing of the file data to the blocks on the LTFS-based storage system.

6. The computer-implemented method of claim 5, wherein a block offset of the file data on the LTFS-based storage system is adjusted such that a remainder of a quotient of the block offset and the size of one of the blocks of the drive becomes equal to the remainder of a quotient of an offset of the file data on the LTFS-based storage system and the size of one of the blocks of the drive.

7. The computer-implemented method of claim 1, wherein the file data corresponds to multiple files, wherein boundaries of the file data are aligned to a size of the blocks on the drive during writing of the file data to the blocks on the LTFS-based storage system.

8. The computer-implemented method of claim 1, wherein the data includes at least some invalidated data resulting from overwriting operations performed on the LTFS-based storage system.

9. The computer-implemented method of claim 1, comprising: writing the file data to the blocks on the LTFS-based storage system prior to copying the data to the blocks of the drive.

10. The computer-implemented method of claim 1, comprising: constructing file metadata so that the copied data on the drive is accessible as one or more files.

11. A computer program product, the computer program product comprising a computer readable storage medium having program instructions embodied therewith, the program instructions readable and/or executable by a controller to cause the controller to:
copy, by the controller, data stored on a Linear Tape File System (LTFS)-based storage system from the LTFS-based storage system to blocks of a Random Access Nonvolatile Memory (RANVM) drive,
wherein the data is copied in units of the blocks of the drive,
wherein the data includes file data, wherein positions at which the file data is written to blocks on the LTFS-based storage system is managed by the LTFS-based storage system according to block numbers in a same manner as file data is managed by the drive; and
construct, by the controller, file metadata so that the copied data on the drive is accessible as one or more files.

12. The computer program product of claim 11, wherein the data copied to the blocks of the drive includes all data stored between a first end of a magnetic recording tape of the LTFS-based storage system and a second end of the magnetic recording tape, wherein no data seek operations are performed on the magnetic recording tape during the copying of the data thereon to the blocks of the drive.

13. The computer program product of claim 11, the program instructions readable and/or executable by the controller to cause the controller to: create, by the controller, a correspondence table during the copying of the data, wherein the correspondence table maps data positions in LTFS to data positions on the drive.

14. The computer program product of claim 11, the program instructions readable and/or executable by the controller to cause the controller to: write, by the controller, the file data to the blocks on the LTFS-based storage system prior to copying the data to the blocks of the drive.

15. The computer program product of claim 14, wherein a boundary of the file data is aligned to a size of the blocks on the drive during the writing of the file data to the blocks on the LTFS-based storage system.

16. The computer program product of claim 15, wherein a block offset of the file data on the LTFS-based storage system is adjusted such that a remainder of a quotient of the block offset and the size of one of the blocks of the drive becomes equal to the remainder of a quotient of an offset of the file data on the LTFS-based storage system and the size of one of the blocks of the drive.

17. The computer program product of claim 11, wherein the data includes file data of multiple files, and the program instructions readable and/or executable by the controller to cause the controller to: write, by the controller, the file data to the blocks on the LTFS-based storage system prior to copying the data to the blocks of the drive, wherein boundaries of the file data are aligned to a size of the blocks on the drive during the writing of the file data to the blocks on the LTFS-based storage system.

18. The computer program product of claim 11, wherein the data includes at least some invalidated data resulting from overwriting operations performed on the LTFS-based storage system.

19. A system, comprising:
a processor; and
logic integrated with the processor, executable by the processor, or integrated with and executable by the processor, the logic being configured to:
copy data stored on a Linear Tape File System (LTFS)-based storage system from the LTFS-based storage system to blocks of a Random Access Nonvolatile Memory (RANVM) drive,
wherein the data is copied in units of the blocks of the drive,
wherein the data includes file data,
wherein positions at which the file data is written to blocks on the LTFS-based storage system is managed by the LTFS-based storage system according to block numbers in a same manner as file data is managed by the drive; and
construct file metadata so that the copied data on the drive is accessible as one or more files.

20. The system of claim 19, wherein the data copied to the blocks of the drive includes all data stored between a first end of a magnetic recording tape of the LTFS-based storage system and a second end of the magnetic recording tape, wherein no data seek operations are performed on the magnetic recording tape during the copying of the data thereon to the blocks of the drive.

21. The system of claim 19, the logic being configured to: create a correspondence table during the copying of the data, wherein the correspondence table maps data positions in LTFS to data positions on the drive.

22. The system of claim 19, wherein a boundary of the file data is aligned to a size of the blocks on the drive during writing of the file data to the blocks on the LTFS-based storage system.

23. The system of claim 22, wherein a block offset of the file data on the LTFS-based storage system is adjusted such that a remainder of a quotient of the block offset and the size of one of the blocks of the drive becomes equal to the remainder of a quotient of an offset of the file data on the LTFS-based storage system and the size of one of the blocks of the drive.

24. The system of claim 19, wherein the data is not copied in units of files of the data.

* * * * *